(12) United States Patent
Zhang

(10) Patent No.: US 12,210,602 B2
(45) Date of Patent: Jan. 28, 2025

(54) UNLOCKING METHOD AND ELECTRONIC DEVICE

(71) Applicant: Huawei Technologies Co., Ltd., Shenzhen (CN)

(72) Inventor: Ziyue Zhang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 443 days.

(21) Appl. No.: 17/621,158

(22) PCT Filed: Jun. 19, 2020

(86) PCT No.: PCT/CN2020/096957
§ 371 (c)(1),
(2) Date: Dec. 20, 2021

(87) PCT Pub. No.: WO2020/253804
PCT Pub. Date: Dec. 24, 2020

(65) Prior Publication Data
US 2022/0245229 A1 Aug. 4, 2022

(30) Foreign Application Priority Data
Jun. 21, 2019 (CN) .......................... 201910544978.7

(51) Int. Cl.
G06F 21/32 (2013.01)
G06V 40/16 (2022.01)

(52) U.S. Cl.
CPC ............ *G06F 21/32* (2013.01); *G06V 40/166* (2022.01)

(58) Field of Classification Search
CPC ...... G06F 21/32; G06F 1/1616; G06F 1/1647; G06F 1/1652; G06F 1/1677;
(Continued)

(56) References Cited

U.S. PATENT DOCUMENTS 11,143,450 B2* 10/2021 Sumihiro ................ F25D 23/12
2016/0105406 A1* 4/2016 Smith .................... H04W 8/26
713/171
(Continued)

FOREIGN PATENT DOCUMENTS

CN 103577737 A 2/2014
CN 104156651 A 11/2014
(Continued)

*Primary Examiner* — Shin-Hon (Eric) Chen
*Assistant Examiner* — Ladimir I Gavrilenko
(74) *Attorney, Agent, or Firm* — Leydig, Voit & Mayer, Ltd.

(57) ABSTRACT

An unlocking method and an electronic device relate to the field of terminal technologies. The method includes: when an inner screen (141) is in a locked and closed state, and an outer screen (142) is in a locked and black state, detecting an operation of turning on the outer screen (142), turning on the outer screen (142), starting a rear-facing camera (132), and starting a first timer; if a face image captured by the rear-facing camera (132) before the first timer expires matches a preset face image, unlocking the outer screen (142), entering a master mode, closing the rear-facing camera (132), stopping the first timer, prompting a user to perform face authentication, and starting a second timer; detecting an operation of unfolding the inner screen (141), turning on the inner screen (141), starting a front-facing camera (131), and locking the outer screen (142); before the second timer expires, if the front-facing camera (131) captures a face image, closing the front-facing camera (131), and stopping the second timer; and if the face image captured by the front-facing camera (131) does not match the preset face image, unlocking the inner screen (141), and entering a guest mode. Therefore, the present invention helps improve convenience of entering the guest mode.

18 Claims, 13 Drawing Sheets

(58) Field of Classification Search
CPC ...... G06F 1/1686; G06F 1/3231; G06F 1/325; G06F 1/3265; G06F 1/3287; G06F 2221/2139; G06V 40/166; Y02D 10/00; Y02D 30/70; H04M 1/0214; H04M 1/0245; H04M 1/724634; H04M 2250/16; H04M 2250/52
See application file for complete search history.

(56) References Cited

U.S. PATENT DOCUMENTS

| | | | |
|---|---|---|---|
| 2017/0243054 A1 | 8/2017 | Lee et al. | |
| 2019/0147676 A1* | 5/2019 | Madzhunkov | H04N 23/10 340/5.2 |
| 2021/0327058 A1* | 10/2021 | Hu | G06V 40/168 |
| 2021/0373602 A1* | 12/2021 | Min | H04B 1/385 |

FOREIGN PATENT DOCUMENTS

| | | | |
|---|---|---|---|
| CN | 104992091 A | 10/2015 | |
| CN | 105897430 A | 8/2016 | |
| CN | 107808086 A | 3/2018 | |
| CN | 108108604 A | 6/2018 | |
| CN | 109542318 A | 3/2019 | |
| CN | 106126999 B | 5/2019 | |
| EP | 3285133 A1 | 2/2018 | |
| WO | 2016187940 A1 | 12/2016 | |

\* cited by examiner

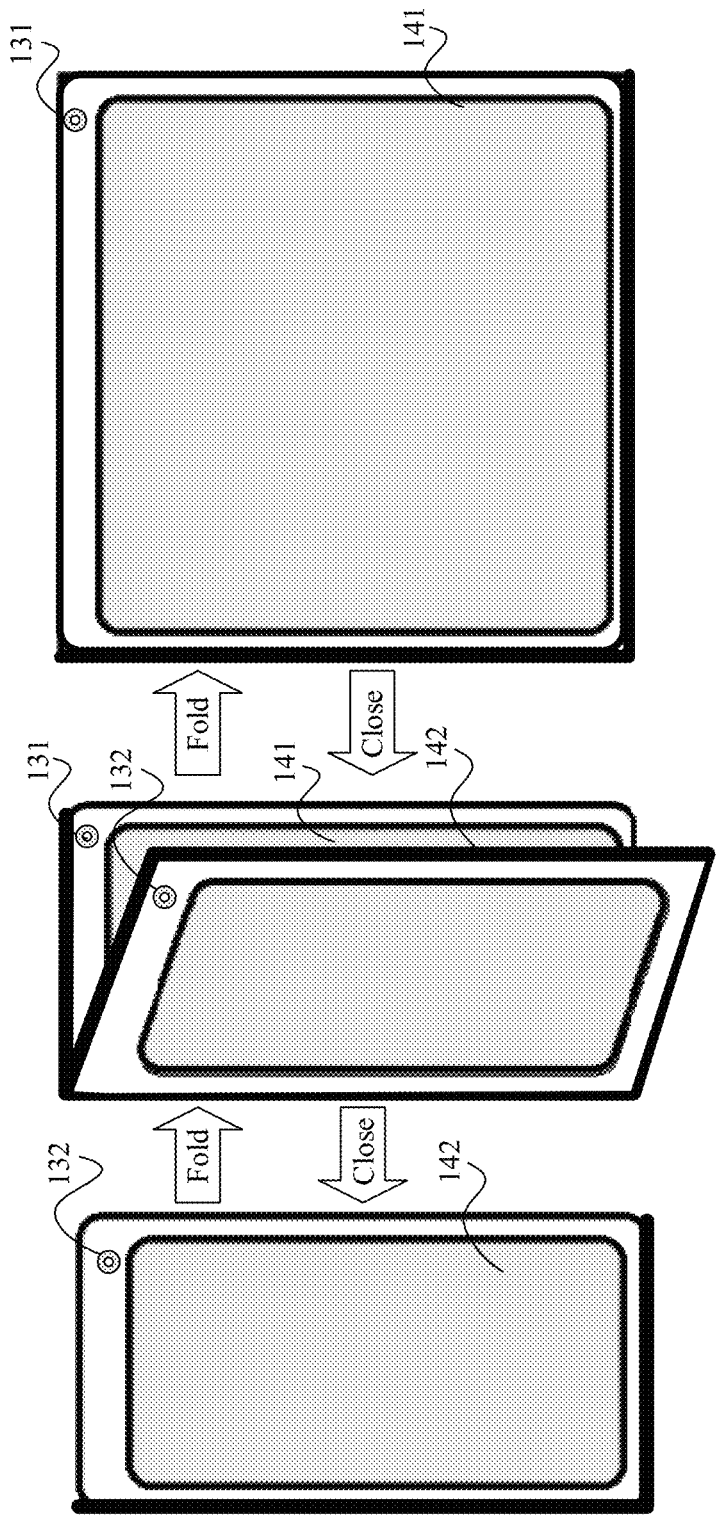

UNLOCKING METHOD AND ELECTRONIC DEVICE

This application claims priority to Chinese Patent Application No. 201910544978.7, filed with the China National Intellectual Property Administration on Jun. 21, 2019 and entitled "UNLOCKING METHOD AND ELECTRONIC DEVICE", which is incorporated herein by reference in its entirety.

TECHNICAL FIELD

Embodiments of this application relate to the field of terminal technologies, and in particular, to an unlocking method and an electronic device.

BACKGROUND

As an electronic device (for example, a mobile phone or a tablet computer) is highly intelligent, the electronic device is highly integrated with personal information of a user. Therefore, the user pays more attention to protecting privacy information on the electronic device. Currently, the user may set a guest mode on the electronic device, so that another user can view or operate the electronic device in guest mode, thereby reducing a possibility that the privacy information is viewed when the user lends the electronic device.

In the prior art, when the electronic device is locked, the user unlocks the electronic device to enter the guest mode by inputting a password corresponding to the guest mode. However, the password corresponding to the guest mode needs to be preset by the user in the electronic device, and such an operation is relatively complex. With continuous advancement of electronic device technologies, how to quickly and conveniently unlock the electronic device to enter the guest mode is of great significance for improving user experience.

SUMMARY

This application provides an unlocking method and an electronic device, to help improve convenience of unlocking the electronic device to enter a guest mode.

According to a first aspect, an embodiment of this application provides an unlocking method, applied to an electronic device, where the electronic device includes an inner screen, an outer screen, a front-facing camera, and a rear-facing camera, the inner screen is a foldable screen, the inner screen and the front-facing camera are located on one side of the electronic device, the outer screen and the rear-facing camera are located on another side of the electronic device, and when the inner screen is in a locked and closed state, and the outer screen is in a locked and black state, detecting an operation of turning on the outer screen; in response to the operation of turning on the outer screen, turning on the outer screen, starting the rear-facing camera, and starting a first timer, where timing duration of the first timer is first duration; before the first timer expires, if the rear-facing camera captures a face image, identifying whether the face image captured by the rear-facing camera matches a preset face image; if the face image captured by the rear-facing camera matches the preset face image, unlocking the outer screen, entering a master mode, closing the rear-facing camera, stopping the first timer, prompting a user to use the front-facing camera to perform face authentication within second duration, and starting a second timer, where timing duration of the second timer is the second duration; detecting an operation of unfolding the inner screen; in response to the operation of unfolding the inner screen, turning on the inner screen, starting the front-facing camera, and locking the outer screen; before the second timer expires, if the front-facing camera captures a face image, closing the front-facing camera, stopping the second timer, and identifying whether the face image captured by the front-facing camera matches the preset face image; and if the face image captured by the front-facing camera matches the preset face image, unlocking the inner screen, and entering a guest mode; or if the face image captured by the front-facing camera does not match the preset face image, unlocking the inner screen, and entering the master mode; or when the second timer expires, if the front-facing camera still has not captured any face image, prompting the user that unlocking the inner screen fails.

In this embodiment of this application, because the electronic device may capture a face image by using the front-facing camera, and unlock the inner screen to enter the guest mode, the user may not need to memorize information such as a password, thereby improving convenience of unlocking the inner screen to some extent to enter the guest mode, and helping improve user experience.

In a possible design, if the face image captured by the rear-facing camera does not match the preset face image, the rear-facing camera continues to capture a face image before the first timer expires; and when the first timer expires, if the rear-facing camera still has not captured the target face image, the rear-facing camera is closed. This helps reduce power consumption of the electronic device and reduce a risk of information leakage in the electronic device.

In a possible design, after the unlocking the inner screen, and entering a guest mode if the face image captured by the front-facing camera does not match the preset face image, caching the face image captured by the front-facing camera in a first storage space. This helps enable a guest to unlock the inner screen by using a face image of the guest after one-time authorization without master authorization, and further simplify an operation manner of the user.

In a possible design, when the inner screen is in a locked and unfolded state, and the outer screen is in the locked and black state, detecting the user's operation of turning on the inner screen; in response to the user's operation of turning on the inner screen, turning on the inner screen, and starting the front-facing camera and a third timer, where timing duration of the third timer is third duration; before the third timer expires, if the front-facing camera captures a face image, closing the front-facing camera, stopping the third timer, and identifying whether the image captured by the front-facing camera matches the preset face image; if the face image captured by the front-facing camera matches the preset face image, unlocking the inner screen, and entering the master mode; or if the face image captured by the front-facing camera does not match the preset face image, determining whether any face image matching the face image captured by the front-facing camera is cached in the first storage space; if a face image matching the face image captured by the front-facing camera is cached in the first storage space, unlocking the inner screen, and entering the guest mode; or if no face image matching the face image captured by the front-facing camera is cached in the first storage space, prompting the user to use the rear-facing camera to perform master authorization within fourth duration, and starting the rear-facing camera and a fourth timer, where timing duration of the fourth timer is the fourth duration; before the fourth timer expires, if the rear-facing camera captures a face image, identifying whether the face image captured by the rear-facing camera matches the preset face image; and if the face image captured by the rear-facing camera matches the preset face image, closing the rear-facing camera, stopping the fourth timer, unlocking the inner screen, and entering the guest mode; or if the face image captured by the rear-facing camera does not match the preset face image, continuing to capture a face image by using the rear-facing camera before the fourth timer expires; and when the fourth timer expires, if the rear-facing camera still has not captured any face image matching the preset face image, closing the rear-facing camera, and prompting the user that unlocking the inner screen fails. This helps simplify an operation manner of the user.

In a possible design, when the third timer expires, if the front-facing camera still has not captured any face image, the front-facing camera is closed. This helps reduce power consumption of the electronic device and reduce a risk of information leakage in the electronic device.

In a possible design, duration of caching the face image captured by the front-facing camera is preset duration. This helps improve security of the electronic device.

In a possible design, the preset face image is a face image of a master.

According to a second aspect, an embodiment of this application provides another unlocking method, applied to an electronic device, where the electronic device includes an inner screen, an outer screen, a front-facing camera, and a rear-facing camera, the inner screen is a foldable screen, the inner screen and the front-facing camera are located on one side of the electronic device, the outer screen and the rear-facing camera are located on another side of the electronic device, and when the inner screen is in a locked and closed state, and the outer screen is in a locked and black state, detecting an operation of unfolding the inner screen; in response to the operation of unfolding the inner screen, turning on the inner screen, starting the front-facing camera, and starting a first timer, where timing duration of the first timer is first duration; before the first timer expires, if the front-facing camera captures a face image, closing the front-facing camera, stopping the first timer, and identifying whether the face image captured by the front-facing camera matches a preset face image; if the face image captured by the front-facing camera matches the preset face image, unlocking the inner screen, and entering a master mode; or if the face image captured by the front-facing camera does not match the preset face image, prompting a user to use the rear-facing camera to perform master authorization within second duration, and starting the rear-facing camera and a second timer, where timing duration of the second timer is the second duration; before the second timer expires, if the rear-facing camera captures a face image, identifying whether the face image captured by the rear-facing camera matches the preset face image; and if the face image captured by the rear-facing camera does not match the preset face image, closing the rear-facing camera, stopping the second timer, unlocking the inner screen, and entering a guest mode; or if the face image captured by the rear-facing camera does not match the preset face image, continuing to capture a face image by using the rear-facing camera before the second timer expires; and when the second timer expires, if the rear-facing camera still has not captured a target face image, closing the rear-facing camera, and prompting the user that unlocking the inner screen fails.

In this embodiment of this application, because the electronic device may capture a face image by using the front-facing camera, and unlock the inner screen to enter the guest mode, the user may not need to memorize information such as a password, thereby improving convenience of unlocking the inner screen to some extent to enter the guest mode, and helping improve user experience.

In a possible design, when the first timer expires, if the front-facing camera still has not captured any face image, the front-facing camera is closed. This helps reduce power consumption of the electronic device and reduce a risk of information leakage in the electronic device.

In a possible design, before the prompting a user to use the rear-facing camera to perform master authorization within second duration if the face image captured by the front-facing camera does not match the preset face image, determining that no face image matching the face image captured by the front-facing camera is cached in a first storage space. This helps simplify an operation manner of the user.

In a possible design, after the unlocking the inner screen, and entering a guest mode, storing a face image captured by the front-facing camera in the first storage space. This helps enable a guest to unlock the inner screen by using a face image of the guest after one-time authorization without master authorization, and further simplify an operation manner of the user.

In a possible design, duration of caching the face image captured by the front-facing camera is preset duration. This helps improve security of the electronic device.

In a possible design, if the face image captured by the front-facing camera does not match the preset face image, and a face image matching the face image captured by the front-facing camera is cached in the first storage space, unlocking the inner screen, and entering the guest mode. This helps further simplify an operation manner of the user.

In a possible design, the preset face image is a face image of a master.

According to a third aspect, an embodiment of this application provides still another unlocking method, applied to an electronic device, where the electronic device includes a display screen, a front-facing camera, and a rear-facing camera, the display screen and the front-facing camera are located on one side of the electronic device, the rear-facing camera is located on another side of the electronic device, and when the display screen is in a locked state, detecting an operation of turning on the display screen; in response to the operation of turning on the display screen, starting the front-facing camera and a first timer, where timing duration of the first timer is first duration; before the first timer expires, if the front-facing camera captures a face image, closing the front-facing camera, stopping the first timer, and identifying whether the face image captured by the front-facing camera matches a preset face image; if the face image captured by the front-facing camera matches the preset face image, unlocking the display screen, and entering a master mode; or if the face image captured by the front-facing camera does not match the preset face image, prompting a user to use the rear-facing camera to perform master authorization within second duration, and starting the rear-facing camera and a second timer, where timing duration of the second timer is the second duration; before the second timer expires, if the rear-facing camera captures a face image, identifying whether the face image captured by the rear-facing camera matches the preset face image; and if the image captured by the rear-facing camera matches the preset face image, closing the rear-facing camera, stopping the second timer, unlocking the inner screen, and entering a guest mode; or if the image captured by the rear-facing camera does not match the preset face image, continuing to capture a face image by using the rear-facing camera before the second timer expires; and when the second timer expires, if the rear-facing camera still has not captured the target face image, closing the rear-facing camera, and prompting the user that unlocking the display screen fails.

In this embodiment of this application, because the electronic device may capture a face image by using the front-facing camera, and unlock the display screen to enter the guest mode, the user may not need to memorize information such as a password, thereby improving convenience of unlocking the display screen to some extent to enter the guest mode, and helping improve user experience.

In a possible design, when the first timer expires, if the front-facing camera still has not captured any face image, the front-facing camera is closed. This helps reduce power consumption of the electronic device and reduce a risk of information leakage in the electronic device.

In a possible design, before the prompting a user to use the rear-facing camera to perform master authorization within second duration if the face image captured by the front-facing camera does not match the preset face image, determining that no face image matching the face image captured by the front-facing camera is cached in a first storage space. This helps simplify an operation manner of the user.

In a possible design, after the unlocking the inner screen, and entering a guest mode, the method includes: caching a face image captured by the front-facing camera in the first storage space. This helps enable a guest to unlock the inner screen by using a face image of the guest after one-time authorization without master authorization, and further simplify an operation manner of the user.

In a possible design, duration of caching the face image captured by the front-facing camera is preset duration. This helps improve security of the electronic device.

In a possible design, if the face image captured by the front-facing camera does not match the preset face image, and a face image matching the face image captured by the front-facing camera is cached in the first storage space, unlocking the display screen, and entering the guest mode. This helps further simplify an operation manner of the user.

According to a fourth aspect, an embodiment of this application provides still another unlocking method, applied to an electronic device, where the electronic device includes a display screen, a front-facing camera, and a rear-facing camera, the display screen and the front-facing camera are located on one side of the electronic device, the rear-facing camera is located on another side of the electronic device, and when the display screen is in a locked state, detecting an operation of turning on the display screen; in response to the operation of turning on the display screen, starting the rear-facing camera and a first timer, where timing duration of the first timer is first duration; before the first timer expires, if the rear-facing camera captures a face image, identifying whether the face image captured by the rear-facing camera matches a preset face image; if the face image captured by the rear-facing camera matches the preset face image, closing the rear-facing camera, stopping the first timer, prompting a user to use the front-facing camera to perform face authentication within second duration, and starting the front-facing camera and a second timer, where timing duration of the second timer is the second duration; before the second timer expires, if the front-facing camera captures a face image, closing the front-facing camera, stopping the second timer, and identifying whether the face image captured by the front-facing camera matches the preset face image; and if the face image captured by the front-facing camera does not match the preset face image, unlocking the inner screen, and entering a guest mode; or if the face image captured by the front-facing camera matches the preset face image, unlocking the inner screen, and entering a master mode; or when the second timer expires, if the front-facing camera still has not captured any face image, prompting the user that unlocking the inner screen fails.

In this embodiment of this application, because the electronic device may capture a face image by using the front-facing camera, and unlock the display screen to enter the guest mode, the user may not need to memorize information such as a password, thereby improving convenience of unlocking the display screen to some extent to enter the guest mode, and helping improve user experience.

In a possible design, if the face image captured by the rear-facing camera does not match the preset face image, the rear-facing camera continues to capture a face image before the first timer expires; and when the first timer expires, if the rear-facing camera still has not captured the target face image, the rear-facing camera is closed. This helps reduce power consumption of the electronic device and reduce a risk of information leakage in the electronic device.

According to a fifth aspect, an embodiment of this application provides an electronic device, including: an inner screen, an outer screen, a front-facing camera, and a rear-facing camera, where the inner screen is a foldable screen, the inner screen and the front-facing camera are located on one side of the electronic device, and the outer screen and the rear-facing camera are located on another side of the electronic device; one or more processors; a memory; and one or more computer programs, where the one or more computer programs are stored in the memory, the one or more computer programs include instructions, and when the instructions are executed by the electronic device, the electronic device is enabled to perform the method according to any one of the first aspect and the possible designs of the first aspect in the embodiments of this application, or the method according to any one of the second aspect and the possible designs of the second aspect in the embodiments of this application.

According to a sixth aspect, an embodiment of this application provides another electronic device, including: a display screen, a front-facing camera, and a rear-facing camera, where the display screen and the front-facing camera are located on one side of the electronic device, and the rear-facing camera is located on another side of the electronic device; one or more processors; a memory; and one or more computer programs, where the one or more computer programs are stored in the memory, the one or more computer programs include instructions, and when the instructions are executed by the electronic device, the electronic device is enabled to perform the method according to any one of the third aspect and the possible designs of the third aspect in the embodiments of this application, or the method according to any one of the fourth aspect and the possible designs of the third aspect in the embodiments of this application.

According to a seventh aspect, an embodiment of this application provides still another electronic device, including one or more processors and a memory, and one or more computer programs, where the one or more computer programs are stored in the memory, the one or more computer programs include instructions, and when the instructions are executed by the electronic device, the electronic device is enabled to perform the method according to any one of the foregoing aspects and the possible designs of the foregoing aspects in the embodiments of this application.

According to an eighth aspect, an embodiment of this application provides a chip, where the chip is coupled to a memory in an electronic device, so that when the chip runs, the chip invokes program instructions stored in the memory, to implement the method according to any one of the foregoing aspects and the possible designs of the foregoing aspects in the embodiments of this application.

According to a ninth aspect, an embodiment of this application provides a computer-readable storage medium, where the computer-readable storage medium stores program instructions, and when the program instructions are run on an electronic device, the device is enabled to perform the method according to any one of the foregoing aspects and the possible designs of the foregoing aspects in the embodiments of this application.

According to a tenth aspect, an embodiment of this application provides a computer program product, where when the computer program product is run on an electronic device, the electronic device is enabled to perform the method according to any one of the foregoing aspects and the possible designs of the foregoing aspects in the embodiments of this application.

According to an eleventh aspect, an embodiment of this application provides a graphical user interface on an electronic device, where the electronic device has a display screen, a camera, a memory, and one or more processors, the one or more processors are configured to execute one or more computer programs stored in the memory, and the graphical user interface includes a graphical user interface displayed when the electronic device performs the method according to any one of the foregoing aspects and the possible implementations of the foregoing aspects.

In addition, for technical effects brought by any possible design of the fifth aspect to the tenth aspect, refer to technical effects brought by different designs in related descriptions of the method part. Details are not described herein again.

BRIEF DESCRIPTION OF DRAWINGS

FIG. 2A, FIG. 2B, and FIG. 2C are schematic diagrams of physical forms of an electronic device according to an embodiment of this application;

DESCRIPTION OF EMBODIMENTS

Figure 1:
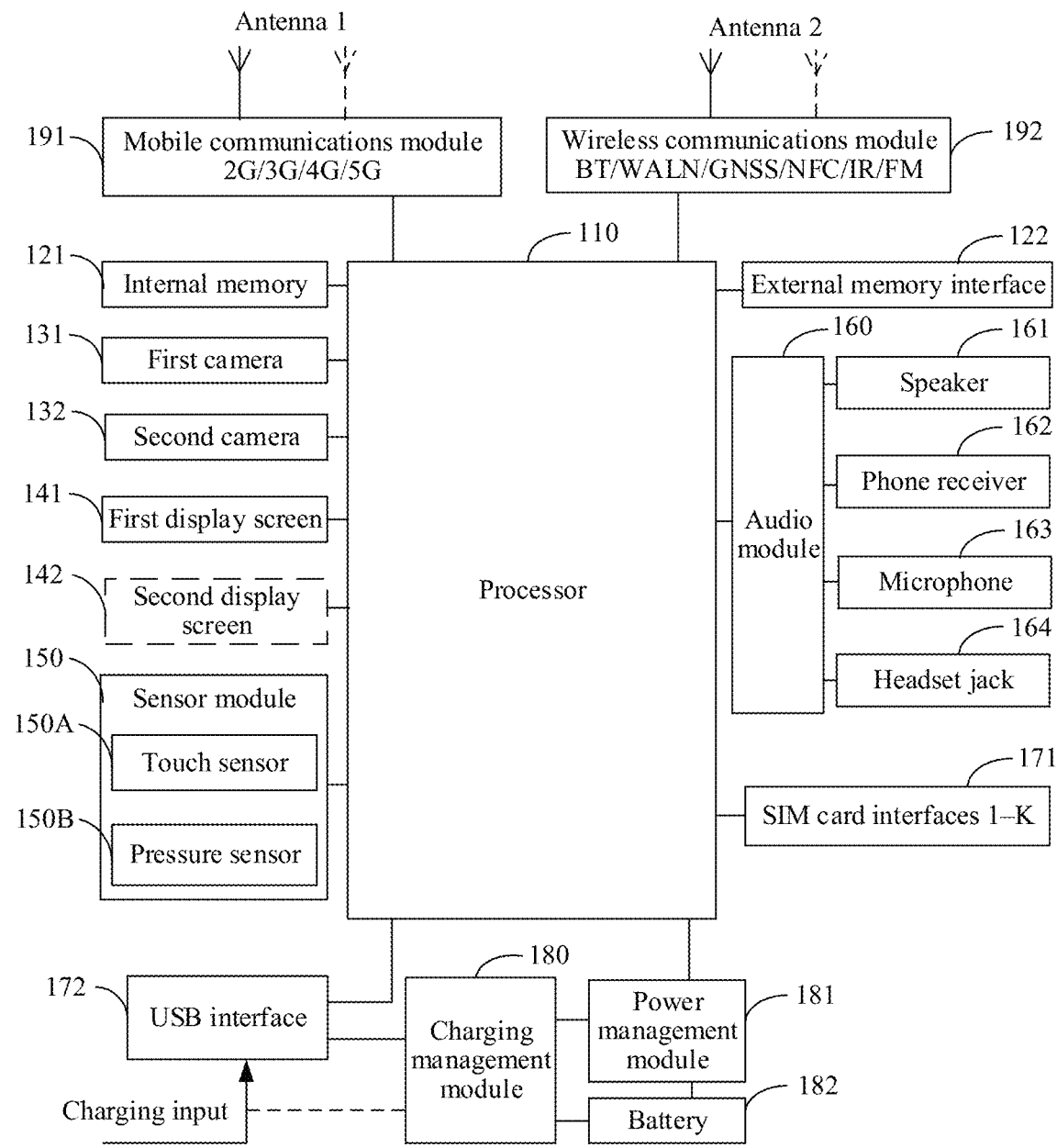
FIG. 1 is a schematic diagram of a hardware structure of an electronic device according to an embodiment of this application.

It should be understood that "I" indicates an "or" relationship unless otherwise specified in this application. For example, the term "A/B" may represent A or B. The term "and/or" in this application is only an association relationship for describing associated objects and represents that three relationships may exist. For example, "A and/or B" may represent the following three cases: Only A exists, both A and B exist, and only B exists. The term "at least one" indicates one or more, and the term "a plurality of" indicates two or more.

In this application, terms such as "for example", "in some embodiments", and "in other embodiments" are used to represent examples, instances, or illustrations. Any embodiment or design scheme described as "an example" in this application should not be construed as preferred or advantageous over other embodiments or design schemes. Specifically, use of the term "example" is intended to present a concept in a concrete manner.

In addition, terms such as "first" and "second" used in this application are intended only for distinguishing description, and shall not be understood as an indication or implication of relative importance, or an implicit indication of a quantity of indicated technical features, or an indication or implication of a sequence.

For ease of understanding by a person skilled in the art, the following explains some of the terms used this application.

1. Guest mode. In guest mode, an electronic device restricts access permissions for some information (for example, multimedia content such as some chat records, videos, images, and documents, or one or more application programs), and opens only information with unrestricted access permissions, so that a guest can conveniently access the electronic device while privacy information of a master in the electronic device is prevented from being viewed or leaked. It should be noted that, in guest mode in the embodiments of this application, a user (that is, the master) may restrict, based on an actual requirement, access permissions for the multimedia content stored on the electronic device and/or an installed application program. For example, in guest mode, the user may restrict access permissions for the multimedia content stored on the electronic device and/or privacy information in secure application programs. For example, the user may restrict, based on an actual requirement, access permissions for the multimedia content stored on the electronic device, such as chat records with one or more users in a social application program, one or more images, one or more videos, and one or more audios, or restrict access permissions for one or more application programs (for example, Alipay or a mobile phone wallet) installed on the electronic device. For example, the application programs installed on the electronic device include a calendar, a camera, Alipay, and WeChat, and the multimedia content stored on the electronic device includes an image 1 and an image 2. In guest mode, the electronic device restricts access permissions for Alipay, WeChat, and the image 2, but does not restrict access permissions for the calendar, the camera, and the image 1. In this case, after the electronic device is unlocked and the guest mode is entered, the image 2 cannot be viewed, and Alipay and WeChat cannot be accessed, but the image 1 can be viewed, and the calendar and the camera can be accessed.

In addition, after the electronic device enters the guest mode, information (for example, some chat records, videos, images, documents, and application programs) with restricted access permissions may be hidden and may not be displayed to the user. To be specific, when the electronic device enters the guest mode, the user is unaware of the information with restricted access permissions. For example, in guest mode, if the electronic device restricts an access permission for Alipay, after entering the guest mode, the electronic device may not display an Alipay icon, so that the guest cannot access Alipay. In other examples, after the electronic device enters the guest mode, information (for example, some chat records, videos, images, documents, and application programs) with restricted access permissions is not hidden. To be specific, when the user of the electronic device enters the guest mode, the user may be aware of the information with restricted access permissions. However, if the user wants to access or view the information with restricted access permissions, the user needs to input information used to verify a user identity, such as a password, a fingerprint, or other information, and after the user identity is successfully verified, the user can view or access the information with restricted access permissions. For example, in guest mode, if the electronic device restricts an access permission for an SMS, the electronic device may display an SMS icon after entering the guest mode, but after the user taps the SMS icon, a prompt box for user identity authentication, for example, a password input box or a fingerprint verification prompt box, is displayed. The electronic device opens the SMS only after the user inputs corresponding information and passes identity authentication.

2. Master mode. In the embodiments of this application, the master mode may also be referred to as a conventional mode, a conventional master mode, a normal mode, or the like. In master mode, the electronic device does not restrict access permissions for information. Therefore, after the electronic device is unlocked and the master mode is entered, the user can access or view all application programs installed on the electronic device, all stored multimedia content, and the like. In other words, it may be understood that, after the electronic device is unlocked and the master mode is entered, access permissions for all the information on the electronic device (for example, the application programs installed on the electronic device, or the multimedia content stored on the electronic device) are open to the user.

In an unlocking method in the embodiments of this application, neither the master nor the guest needs to memorize a password, and no complicated setting is required, so that when the electronic device screen is locked, the guest can quickly and conveniently unlock the electronic device to enter the guest mode. This helps improve use convenience of the guest while protecting privacy of the master, thereby greatly improving user experience. It should be understood that, in the embodiments of this application, the guest may be a relative, a friend, a spouse, a child, a colleague, a stranger, or the like of the master. The master is not limited in the embodiments of this application.

The following describes an electronic device, a graphical user interface (GUI) used for the electronic device, and an embodiment using the electronic device. For ease of description, the GUI is referred to as a user interface below.

The electronic device in the embodiments of this application may be a portable electronic device, such as a mobile phone (for example, a mobile phone with a foldable screen), a tablet computer, a wearable device, or an augmented reality (AR) or virtual reality (VR) device. Specifically, in an example embodiment, an operating system installed on the electronic device includes but is not limited to IOS®, Android®, Microsoft®, or the like. In other embodiments, the electronic device in the embodiments of this application may alternatively be another electronic device, for example, a notebook computer.

For example, FIG. 1 is a schematic diagram of a hardware structure of an electronic device according to an embodiment of this application. As shown in FIG. 1, the electronic device includes a processor 110, an internal memory 121, an external memory interface 122, a first camera 131, a second camera 132, a first display screen 141, a sensor module 150, an audio module 160, a speaker 161, a phone receiver 162, a microphone 163, a headset jack 164, a subscriber identity module (SIM) card interface 171, a universal serial bus (USB) interface 172, a charging management module 180, a power management module 181, a battery 182, a mobile communications module 191, and a wireless communications module 192. In other embodiments, the electronic device further includes a second display screen 142. The first camera 131 and the first display screen 141 are located on a first side of the electronic device. The second camera 132 and the second display screen 142 are located on a second side of the electronic device. The first side and the second side of the electronic device are different. For example, the first side may be a front side of the electronic device, and the second side may be a back side of the electronic device. In addition, in this embodiment of this application, the electronic device may further include a motor, an indicator, a key, and the like.

It should be understood that the hardware structure shown in FIG. 1 is merely an example. The electronic device in this embodiment of this application may have more or fewer components than the electronic device shown in the figure, may combine two or more components, or may have different component configurations. Each component shown in the figure may be implemented in hardware, software, or a combination of hardware and software including one or more signal processing and/or application-specific integrated circuits.

The processor 110 may include one or more processing units. For example, the processor 110 may include an application processor (AP), a modem, a graphics processing unit (GPU), an image signal processor (ISP), a controller, a video codec, a digital signal processor (DSP), a baseband processor, and/or a neural-network processing unit (NPU), and the like. In a specific implementation, different processing units may be independent components, or may be integrated into one or more processors.

In some embodiments, a cache may be further disposed in the processor 110, and is configured to store instructions and data. For example, the cache in the processor 110 may be a cache. The cache may be configured to store instructions or data just used, generated, or cyclically used by the processor 110. If the processor 110 needs to use the instructions or data, the processor 110 may invoke the instructions or data directly from the cache. This helps reduce the time of obtaining the instructions or data by the processor 110, thereby helping improve efficiency of the system.

The internal memory 121 may be configured to store programs and/or data. In some embodiments, the internal memory 121 includes a program storage area and a data storage area. The program storage area may be configured to store an operating system (for example, an operating system such as Android or IOS), a computer program required by at least one function (for example, a face recognition function or a sound play function), and the like. The data storage area may be configured to store data (such as audio data or a face image) and the like created and/or captured in a process of using the electronic device. For example, the processor 110 may invoke a program and/or data stored in the internal memory 121, so that the electronic device performs a corresponding method, to implement one or more functions. For example, the processor 110 invokes some programs and/or data in the internal memory, so that the electronic device performs an unlocking method provided in an embodiment of this application, and that a user can quickly and conveniently unlock the electronic device to enter a guest mode. The internal memory 121 may be a high-speed random access memory, and/or a non-volatile memory, or the like. For example, the non-volatile memory may include at least one of one or more magnetic disk storage devices, a flash memory, and/or a universal flash storage (UFS).

The external memory interface 122 may be configured to connect an external storage card (for example, a micro-SD card), to expand a storage capability of the electronic device. The external storage card communicates with the processor 110 by using the external memory interface 122, to implement a data storage function. For example, the electronic device may store files such as images, music, and videos in the external storage card by using the external memory interface 122.

The first camera 131 and the second camera 132 may be configured to capture a moving image, a still image, and the like. The first camera 131 is used as an example. Generally, the first camera 131 includes a lens and an image sensor. An optical image of an object, generated by the lens, is projected onto the image sensor, and then converted into an electrical signal for subsequent processing. For example, the image sensor may be a charge coupled device (CCD) or a complementary metal-oxide-semiconductor (CMOS) phototransistor. The image sensor converts an optical signal into an electrical signal, and then transfers the electrical signal to the ISP to convert the electrical signal into a digital image signal. For a specific implementation of the second camera 132, refer to the specific implementation of the first camera 131. Details are not described herein again. It should be noted that, in this embodiment of this application, the first camera 131 may include one or more cameras, and the second camera 132 may also include one or more cameras. This is not limited. For example, in this embodiment of this application, the first camera 131 and the second camera 132 are configured to capture face images.

The first display screen 141 may include a display panel configured to display a user interface. The display panel may use a liquid crystal display (LCD), an organic light-emitting diode (OLED), an active-matrix organic light emitting diode or an active matrix organic light emitting diode (AMOLED), a flex light-emitting diode (FLED), a Miniled, a MicroLed, a Micro-oLed, a quantum dot light emitting diode (QLED), or the like. For example, the electronic device may implement a display function by using the GPU, the first display screen 141, the application processor, or the like. It should be noted that the first display screen 141 may be a foldable screen, or may be an unfoldable screen. This is not limited. It should be noted that, for a specific implementation of the second display screen 142, refer to a specific implementation of the first display screen 141. Details are not described herein again.

For example, the electronic device includes the first display screen 141 and the second display screen 142. When the first display screen 141 is a foldable screen, and the second display screen 142 is an unfoldable screen, as shown in FIG. 2A, FIG. 2B, and FIG. 2C, the second display screen 142 and the second camera 132 are located on the back side of the electronic device, and the first display screen 141 and the first camera 131 are located on the front side of the electronic device. The second display screen 142 may be referred to as an outer screen, an auxiliary screen, or the like. The second camera 132 may be referred to as a rear-facing camera. The first display screen 141 may be referred to as an inner screen, a main screen, or the like, and the first camera 131 may be referred to as a front-facing camera. It should be noted that an included angle of the first display screen 141 shown in FIG. 2A is 0°, that is, the first display screen 141 is in a folded state or a closed state; and an included angle of the first display screen 141 shown in FIG. 2C is 180°, that is, the first display screen 141 is in an unfolded state. Specifically, when the first display screen 141 is in the closed state as shown in FIG. 2A, the user may unfold the first display screen 141, so that the first display screen 141 is in the unfolded state, as shown in FIG. 2C. When the first display screen 141 is in the unfolded state as shown in FIG. 2C, the user may fold the first display screen 141, so that the first display screen 141 is in the closed state, as shown in FIG. 2A. It should be noted that the electronic device in this embodiment of this application may alternatively not include the second display screen 142.

Figure 3A:
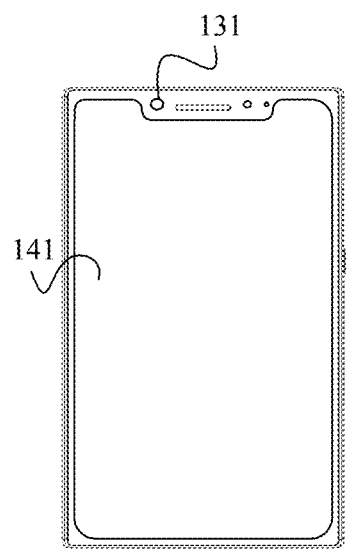
FIG. 3A and FIG. 3B are schematic diagrams of physical forms of another electronic device according to an embodiment of this application.

For another example, the electronic device includes the first display screen 141, the first display screen 141 is an unfoldable screen, and the first display screen 141 is located on the front side of the electronic device, as shown in FIG. 3A. The back side of the electronic device may be shown in FIG. 3B. Because the first camera 131 and the first display screen 141 are located on one side of the electronic device, that is, the front side of the electronic device, the first camera 131 may also be referred to as a front-facing camera. Because the second camera 132 is located on the back side of the electronic device, the second camera 132 may also be referred to as a rear-facing camera.

The sensor module 150 may include one or more sensors, for example, a touch sensor 150A or a pressure sensor 150B. In other embodiments, the sensor module 150 may further include a gyroscope, an acceleration sensor, a fingerprint sensor, an ambient light sensor, a proximity sensor, an optical proximity sensor, a bone conduction sensor, a temperature sensor, an infrared dot matrix emitter, a floodlight element, a time of flight (TOF) proximity sensor, and the like. For example, one or more of the infrared dot matrix emitter, the floodlight element, or the TOF proximity sensor may be integrated on the first camera 131 and/or the second camera 132 and configured to capture a face image of the user.

The touch sensor 150A may also be referred to as a "touch panel". The touch sensor 150A may be disposed on the first display screen 141 and/or the second display screen 142. For example, the touch sensor 150A is disposed on the first display screen 141. The touch sensor 150A and the first display screen 141 form a first touchscreen, which is also referred to as a "first touchscreen". The touch sensor 150A is configured to detect a touch operation that acts on or near the touch sensor 150A. The touch sensor 150A may transfer the detected touch operation to the application processor to determine a touch event type. The electronic device may provide, by using the first display screen 141, a visual output related to the touch operation, and the like. In other embodiments, the touch sensor 150A may alternatively be disposed on a surface of the electronic device, or disposed in a position different from the first display screen 141.

The pressure sensor 150B is configured to sense a pressure signal and may convert the pressure signal into an electrical signal. For example, the pressure sensor 150B may be disposed on the first display screen 141 and/or the second display screen 142. Touch operations that act on a same touch position but have different touch operation intensities may correspond to different operation instructions.

The electronic device may implement an audio function by using the audio module 160, the speaker 161, the phone receiver 162, the microphone 163, the headset jack 164, the application processor, and the like, for example, an audio play function, a recording function, and a voice wakeup function.

The audio module 160 may be configured to perform digital-to-analog conversion and/or analog-to-digital conversion on audio data, and may be further configured to encode and/or decode audio data. For example, the audio module 160 may be disposed in the processor 110, or some functional modules of the audio module 160 may be disposed in the processor 110.

The speaker 161, also referred to as a "horn", is configured to convert audio data into sound and play the sound. For example, the electronic device 100 may listen to music, answer a speakerphone call, or give a voice prompt by using the speaker 161.

The phone receiver 162, also referred to as a "receiver", is configured to convert audio data into sound and play the sound. For example, when the electronic device 100 answers a call, the phone receiver 162 may be placed close to a human ear to answer the call.

The microphone 163, also referred to as a "microphone" or "microphone", is configured to capture sound (for example, ambient sound, including sound made by people, sound made by a device, and the like), and convert the sound into audio electrical data. When making a call or sending a speech, the user may speak with a mouth close to the microphone 163, and the microphone 163 captures the speech made by the user. It should be noted that at least one microphone 163 may be disposed in the electronic device. For example, two microphones 163 are disposed in the electronic device, so that in addition to capturing sound, the electronic device can further implement a noise reduction function. For another example, three, four, or more microphones 163 may be further disposed in the electronic device, so that in addition to capturing sound and reducing noise, the electronic device can further implement functions such as sound source identification and directional recording.

The headset jack 164 is configured to connect a wired headset. The headset jack 164 may be a USB interface 170, or may be a 3.5 mm Open Mobile Terminal Platform (OMTP) standard interface, a Cellular Telecommunications Industry Association of the USA (CTIA) standard interface, or the like.

The SIM card interface 171 is configured to connect a SIM card. The SIM card may be inserted into the SIM card interface 171 or pulled out of the SIM card interface 171, so that the SIM card is in contact with or separated from the electronic device. The electronic device may support one SIM card interface 171 or K SIM card interfaces 171, where K is a positive integer greater than 1. The SIM card interface 171 may support a nano-SIM card, a micro-SIM card, and/or a SIM card, and the like. A plurality of SIM cards may be inserted into the same SIM card interface 171 at the same time. Types of the plurality of SIM cards may be the same or may be different. The SIM card interface 171 may also be compatible with different types of SIM cards. The SIM card interface 171 may also be compatible with an external storage card. The electronic device interacts with a network by using the SIM card, to implement a call function, a data communication function, and the like. In some embodiments, the electronic device may further use an eSIM card, that is, an embedded SIM card. The eSIM card may be embedded in the electronic device, but cannot be separated from the electronic device.

The USB interface 172 is an interface that complies with a USB standard specification, and may be specifically a mini USB interface, a micro-USB interface, a USB type C interface, or the like. The USB interface 172 may be configured to connect a charger to charge the electronic device, or may be configured to transmit data between the electronic device and a peripheral device, or may be configured to connect a headset and play sound by using the headset. For example, the USB interface 172 may be not only used as the headset jack 164, but also configured to connect another electronic device, for example, an AR device or a computer.

The charging management module 180 is configured to receive a charging input from the charger. The charger may be a wireless charger, or may be a wired charger. In some wired charging embodiments, the charging management module 180 may receive a charging input of the wired charger by using the USB interface 170. In some wireless charging embodiments, the charging management module 180 may receive a wireless charging input by using a wireless charging coil of the electronic device. When charging the battery 182, the charging management module 180 may further supply power to the electronic device by using the power management module 180.

The power management module 181 is configured to connect the battery 182, the charging management module 180, and the processor 110. The power management module 181 receives an input from the battery 182 and/or the charging management module 180, and supplies power to the processor 110, the internal memory 121, the first camera 131, the second camera 132, the first display screen 141, and the like. The power management module 181 may be further configured to monitor parameters such as a battery capacity, a quantity of battery cycles, and a battery health status (electric leakage and impedance). In other embodiments, the power management module 181 may alternatively be disposed in the processor 110. In other embodiments, the power management module 181 and the charging management module 180 may alternatively be disposed in a same component.

The mobile communications module 191 may provide a wireless communications solution applied to the electronic device and including 2G/3G/4G/5G. The mobile communications module 191 may include a filter, a switch, a power amplifier, a low noise amplifier (LNA), and the like.

The wireless communications module 192 may provide a wireless communications solution applied to the electronic device and including a WLAN (for example, a Wi-Fi network), Bluetooth (BT), a global navigation satellite system (GNSS), frequency modulation (FM), a near field communication (NFC) technology, an infrared (IR) technology, and the like. The wireless communications module 192 may be one or more components integrating at least one communication processing module.

In some embodiments, an antenna 1 of the electronic device is coupled to the mobile communications module 191, and an antenna 2 is coupled to the wireless communications module 192, so that the electronic device can communicate with another device. Specifically, the mobile communications module 191 may communicate with another device by using the antenna 1, and the wireless communications module 193 may communicate with another device by using the antenna 2.

Figure 4:
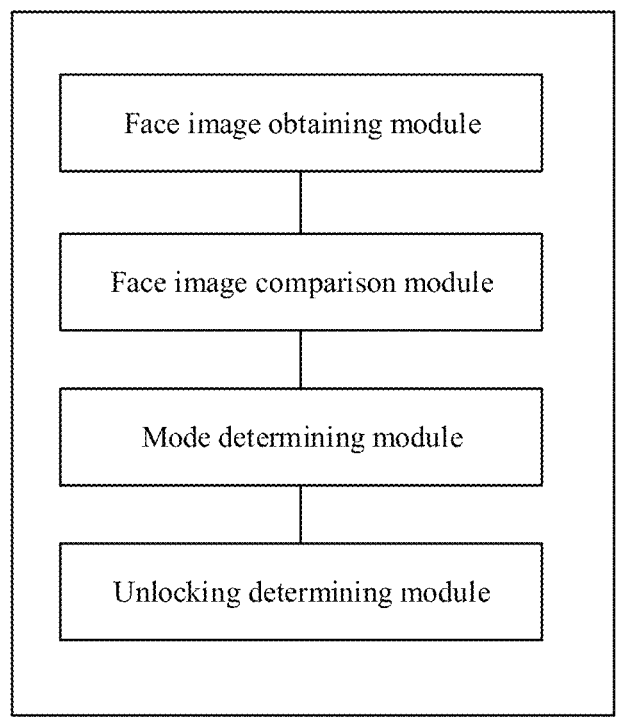
FIG. 4 is a schematic diagram of a software structure of an electronic device according to an embodiment of this application.

For example, FIG. 4 is a schematic architectural diagram of software of an electronic device according to an embodiment of this application. The electronic device includes a face image obtaining module, a face image comparison module, a mode determining module, and an unlocking determining module.

The face image obtaining module is configured to obtain a face image captured by a first camera 131 or a second camera, and determine which of the first camera 131 and the second camera 132 is used to capture the face image.

The face image comparison module is configured to identify whether the face image obtained by the face image obtaining module is a preset face image.

The mode determining module is configured to determine, based on a result of identifying the face image by the face image comparison module, whether to enter a guest mode or a master mode, or that neither a master mode nor a guest mode can be entered.

The unlocking determining module is configured to determine, based on a determining result of the mode determining module, whether to perform unlocking to enter the guest mode or the master mode, or whether unlocking fails, or the like.

The electronic device shown in FIG. 4 may include more or fewer modules, and may combine two or more modules. Each module shown in the figure may be implemented in hardware, software, or a combination of hardware and software including one or more signal processing and/or application-specific integrated circuits. It should be noted that the face image obtaining module, the face image comparison module, the mode determining module, and the unlocking determining module shown in FIG. 4 may be integrated into one or more processing units in the processor 110 shown in FIG. 1. For example, a part or all of the face image obtaining module, the face image comparison module, the mode determining module, and the unlocking determining module may be integrated into one or more processors, such as an application processor or a dedicated processor.

The following embodiments may be all implemented in an electronic device having the foregoing hardware structure and/or software structure.

Figure 5:
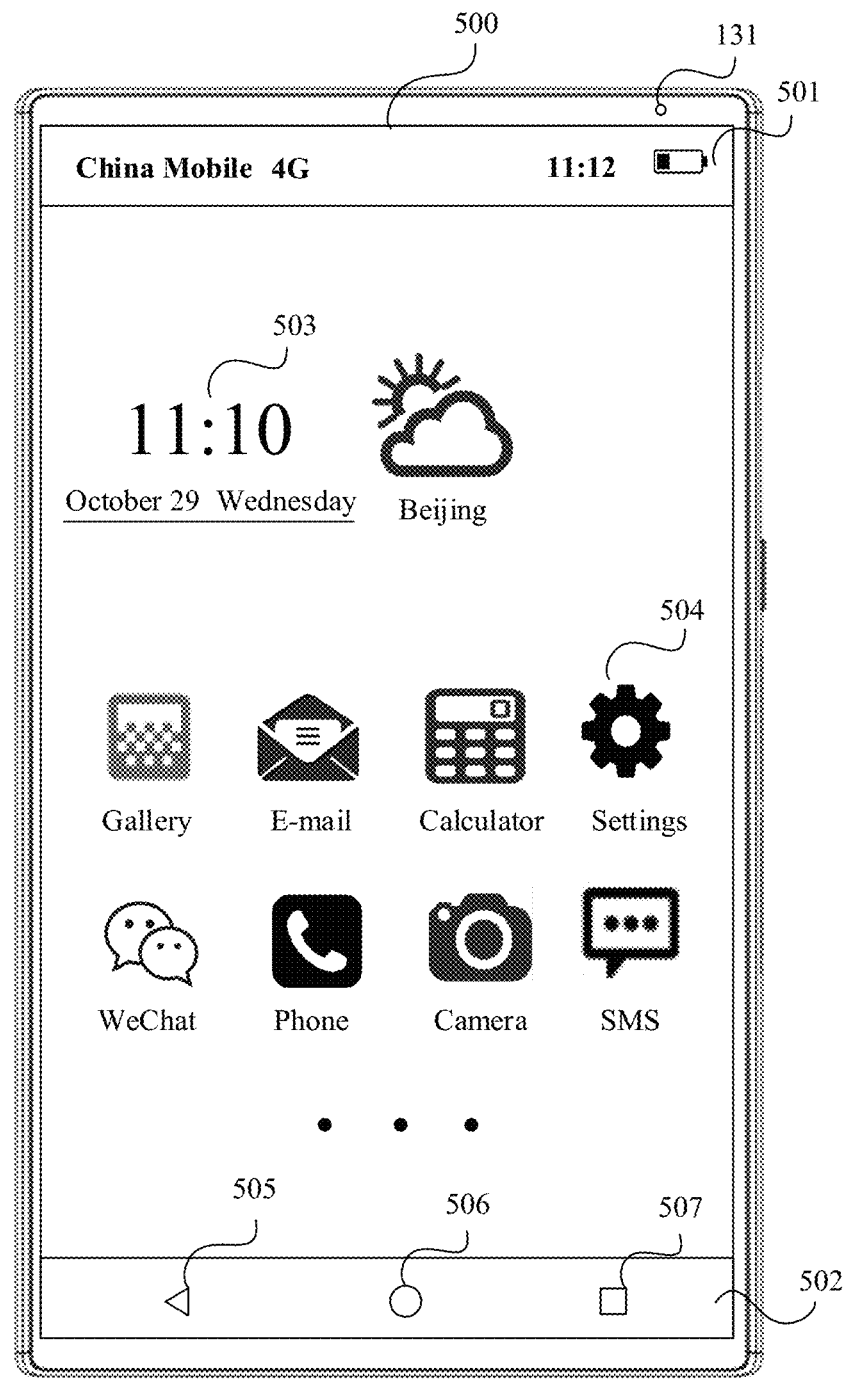
FIG. 5 is a schematic diagram of a user interface according to an embodiment of this application.

The first display screen 141 is used as an example. For example, a main interface displayed on the first display screen 141 by the electronic device may be a user interface 500 shown in FIG. 5. The user interface 500 may include a status bar 501, a collapsible navigation bar 502, a time and weather widget 503, icons (for example, a settings icon 504) of a plurality of application programs, and the like. The status bar 501 may include a name of an operator (China Mobile), a mobile network identifier (for example, 4G), time, and remaining power of the battery. The navigation bar 502 may include a back button 505, a home button 506, and a historical task viewing button (menu button) 507. It may be understood that, in other embodiments, the status bar 501 may further include a Bluetooth icon, a Wi-Fi icon, an external device icon, and the like. It may also be understood that, in other embodiments, the user interface 500 may further include a dock bar. The dock bar may include icons of frequently used application programs, and the like. After detecting a touch operation performed by a finger (or a stylus or the like) of the user on an icon of an application program, the electronic device starts the application program in response to the touch operation, and displays a user interface of the application program on the first display screen 141. For example, if the electronic device detects a touch operation on the settings icon 504, the electronic device displays a system settings interface on the first display screen 141 in response to the touch operation. For example, the system settings interface may include a plurality of setting options for setting corresponding functions. For example, by using the system settings interface, the user may set information (for example, application programs, or multimedia content such as images, videos, audios, and documents) with restricted access permissions in guest mode. For another example, by using the system settings interface, the user may set information accessible in guest mode, and after the electronic device is unlocked and the guest mode is entered, the user cannot access other information than the information accessible in guest mode that is set on the system settings interface.

The following describes an unlocking method in an embodiment of this application by using an electronic device with a foldable screen (for example, the electronic device shown in FIG. 2A, FIG. 2B, and FIG. 2C) as an example. Hereinafter, the first display screen 141 is referred to as an inner screen, the second display screen 142 is referred to as an outer screen, the first camera 131 is referred to as a front-facing camera, and the second camera 132 is referred to as a rear-facing camera.

Example 1

Figure 6:
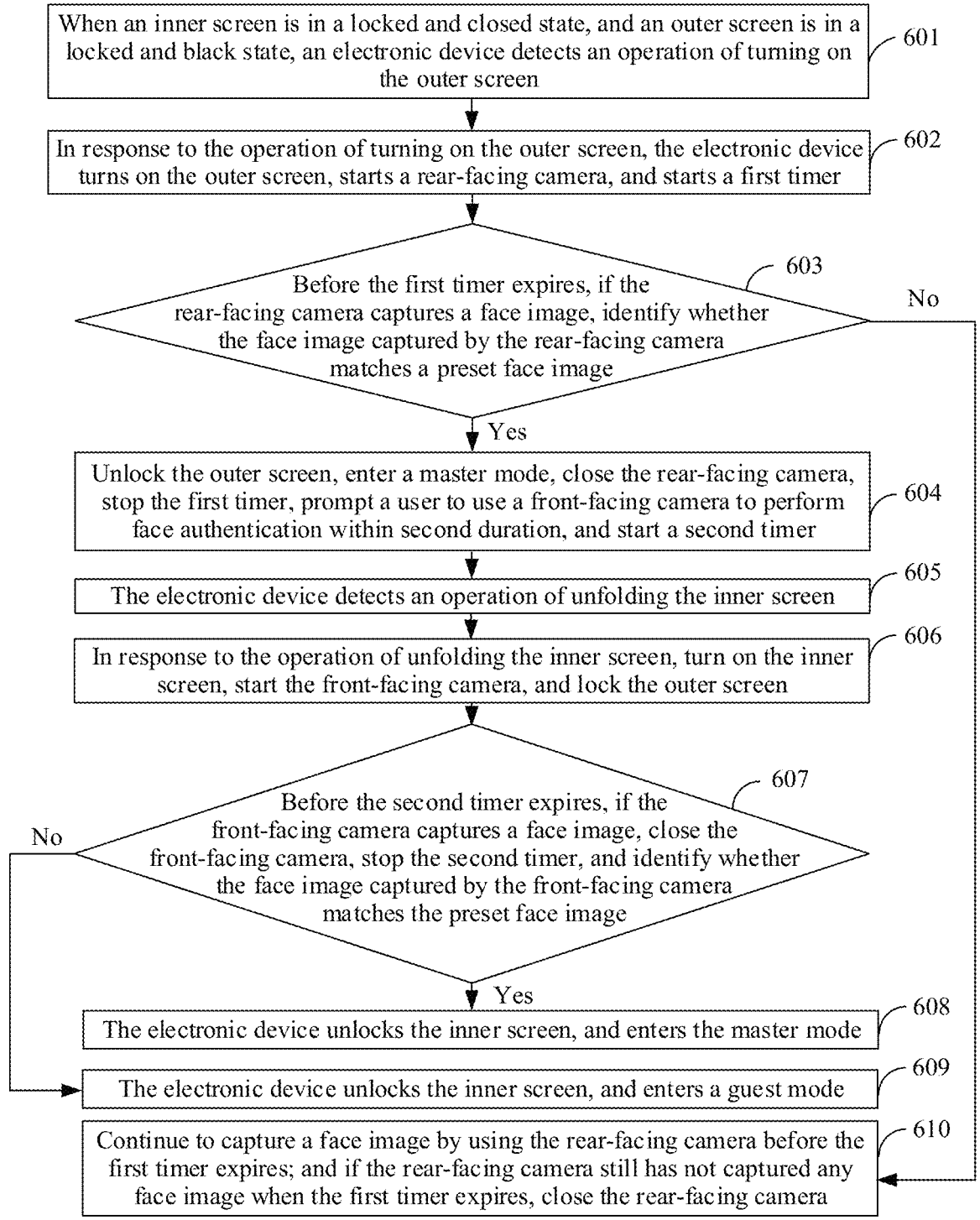
FIG. 6 is a schematic flowchart of an unlocking method according to an embodiment of this application.

FIG. 6 is a schematic flowchart of an unlocking method according to an embodiment of this application. The method specifically includes the following steps.

Step 601: When an inner screen is in a locked and closed state, and an outer screen is in a locked and black state, an electronic device detects an operation of turning on the outer screen.

It should be noted that, in this embodiment of this application, the outer screen being in the locked and black state may be understood as the outer screen being locked and turned off. When the inner screen is in the locked and closed state, the inner screen is usually in the locked and black state.

For example, the operation of turning on the outer screen may be a gesture operation, or may be a voice instruction, or may be an operation on a key (for example, a power key or a volume key) on the electronic device. For example, the gesture operation may be an operation such as tapping, double-tapping, pressing, or sliding on the outer screen. This is not limited.

Step 602: In response to the operation of turning on the outer screen, the electronic device turns on the outer screen, starts a rear-facing camera, and starts a first timer, where timing duration of the first timer is first duration.

Turning on the outer screen by the electronic device in response to the operation of turning on the outer screen may be understood as turning on but not unlocking the outer screen when the electronic device detects the operation of turning on the outer screen.

The timing duration of the first timer may be a default value of a system, or may be preset based on a user requirement, for example, 15 seconds or 20 seconds. This is not limited.

Step 603: Before the first timer expires, if the rear-facing camera captures a face image, the electronic device identifies whether the face image captured by the rear-facing camera matches a preset face image, and if yes, performs step 604, or if no, performs step 610.

Figure 7:
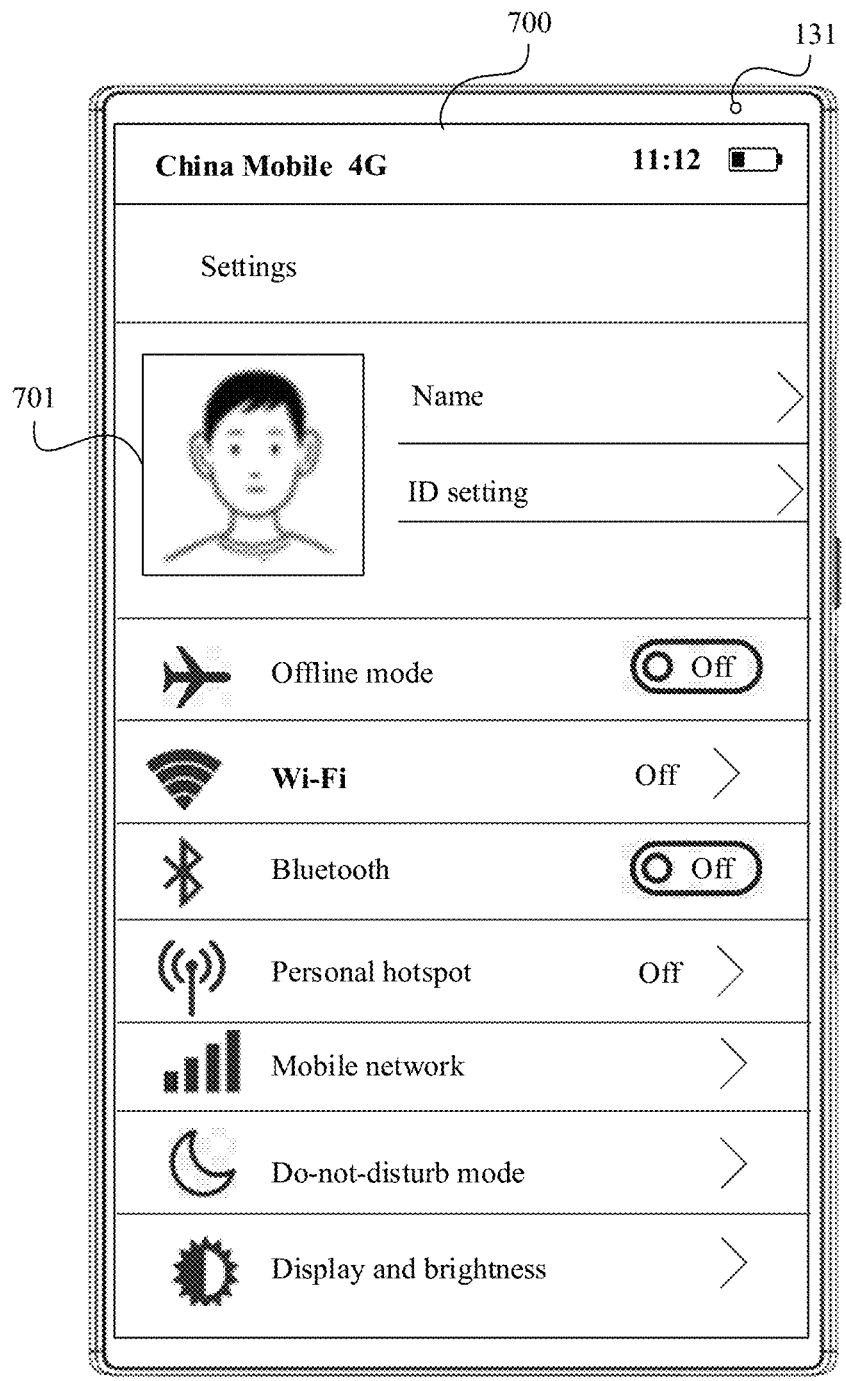
FIG. 7 is a schematic diagram of another user interface according to an embodiment of this application.

For example, the preset face image is a face image of a master, or a face image preset in the electronic device. Specifically, in this embodiment of this application, the preset face image may be determined by the electronic device based on a face image that appears most frequently among images stored by the electronic device, or may be determined based on a face image preset on a user interface. This is not limited. For example, the preset face image may be set by a user on a system settings interface. For example, the system settings interface may be a user interface 700 shown in FIG. 7. The electronic device may preset a face image in a position of a virtual button 701 in response to an operation on the virtual button 701.

It may be understood that, that the face image captured by the rear-facing camera matches the preset face image means that the face image captured by the rear-facing camera and the preset face image are face images of a same person, but are not necessarily the same. For example, if the preset face image is the face image of the master, and the face image captured by the rear-facing camera matches the preset face image, the face image captured by the rear-facing camera is a face image of the master, but is not necessarily the same as the preset face image. For example, the face image of the master captured by the rear-facing camera may have a hair style different from that of the preset face image, but the two face images are face images of the same person. If the face image captured by the rear-facing camera does not match the preset face image, it may be understood that the face image captured by the rear-facing camera and the preset face image are face images of different persons. For example, the face image captured by the rear-facing camera is a face image of a guest, and the preset face image is the face image of the master.

Step 604: The electronic device unlocks the outer screen, enters a master mode, closes the rear-facing camera, stops the first timer, prompts the user to use a front-facing camera to perform face authentication within second duration, and starts a second timer, where timing duration of the second timer is the second duration.

It should be noted that the timing duration of the second timer may be a default value of the system, or may be preset based on a user requirement, for example, 15 seconds or 20 seconds. This is not limited. The second duration and the first duration may be the same or different. This is not limited.

In the unlocking method shown in FIG. 6, when the inner screen of the electronic device is in the locked and closed state, the inner screen is not unlocked and may remain locked regardless of whether the outer screen is unlocked, that is, when the inner screen is in the locked and closed state, whether the outer screen is unlocked does not affect the locking of the inner screen.

For example, the electronic device may display a prompt box on the outer screen to prompt the user to perform face authentication within the second duration, or may play a voice prompt by using a microphone to prompt the user to perform face authentication within the second duration, or may prompt the user in another manner to perform face authentication within the second duration. This is not limited.

Step 605: The electronic device detects an operation of unfolding the inner screen.

Step 606: In response to the operation of unfolding the inner screen, turn on the inner screen, start the front-facing camera, and lock the outer screen.

To be specific, when the inner screen is in the closed state, the user unlocks the outer screen, but after the inner screen is unfolded from the closed state to an unfolded state, the user may not need to use the outer screen. Therefore, the outer screen may be locked and turned off, and the inner screen is turned on, but the inner screen is not unlocked. If the inner screen is unlocked, face authentication needs to be further performed. This helps reduce power consumption of the electronic device and improve security of the electronic device.

Step 607: Before the second timer expires, if the front-facing camera captures a face image, the electronic device closes the front-facing camera, stops the second timer, identifies whether the face image captured by the front-facing camera matches the preset face image, and if yes, performs step 608, or if no, performs step 609.

For the matching between the face image captured by the front-facing camera and the preset face image, refer to related descriptions about the matching between the face image captured by the rear-facing camera and the preset face image. For the mismatching between the face image captured by the front-facing camera and the preset face image, refer to related descriptions about the mismatching between the face image captured by the rear-facing camera and the preset face image. Details are not described herein again.

Step 608: The electronic device unlocks the inner screen, and enters the master mode.

In some embodiments, when the inner screen is in the unfolded state, the electronic device unlocks the inner screen, and enters the master mode. Further, if the electronic device detects again an operation of folding the inner screen, so that the inner screen is in the closed state after being folded, the electronic device automatically unlocks the outer screen in response to the operation of folding the inner screen, enters the master mode, and locks the inner screen. For example, after the outer screen is unlocked, the electronic device may map a user interface displayed on the inner screen to the outer screen for corresponding displaying. For another example, after the outer screen is unlocked, the electronic device may also display a desktop in master mode on the outer screen.

Step 609: The electronic device unlocks the inner screen, and enters a guest mode.

In some embodiments, when the inner screen is in the unfolded state, the electronic device unlocks the inner screen, and enters the guest mode. Further, if the electronic device detects again an operation of folding the inner screen, so that the inner screen is in the closed state after being folded, the electronic device automatically unlocks the outer screen in response to the operation of folding the inner screen, enters the guest mode, and locks the inner screen. For example, after the outer screen is unlocked, the electronic device may map the user interface displayed on the inner screen to the outer screen for corresponding displaying. For another example, after the outer screen is unlocked, the electronic device may also display a desktop in guest mode on the outer screen.

Further, when the second timer expires, if the front-facing camera still has not captured any face image, the electronic device prompts the user that unlocking fails. For example, when the second timer expires, if the front-facing camera still has not captured any face image, the front-facing camera is closed, and the inner screen is automatically turned off. This helps reduce power consumption.

Step 610: Before the first timer expires, the rear-facing camera continues to capture a face image until the first timer expires, and if the rear-facing camera still has not captured any face image, the rear-facing camera is closed. Further, when the first timer expires, the outer screen is turned off.

In other embodiments, when the first timer expires, if the rear-facing camera still has not captured any face image matching the preset face image, the user may be further prompted that no preset face image is captured by using the rear-facing camera, and whether to continue to keep the rear-facing camera on. Based on a user requirement, the user may continue to keep the rear-facing camera on, and wait to capture a face image matching the preset face image, or close the rear-facing camera, and no longer capture a face image matching the preset face image. This helps implement interaction between the electronic device and the user.

Figure 8C:
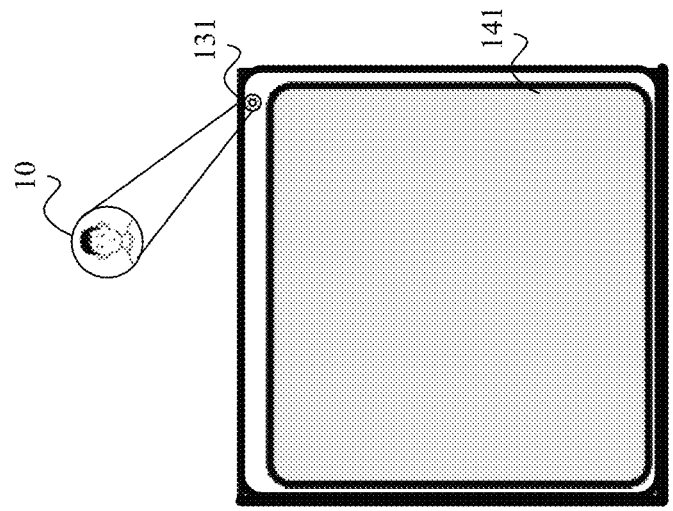
FIG. 8A, FIG. 8B, and FIG. 8C are schematic diagrams of different physical forms of an electronic device according to an embodiment of this application.
Figure 8B:
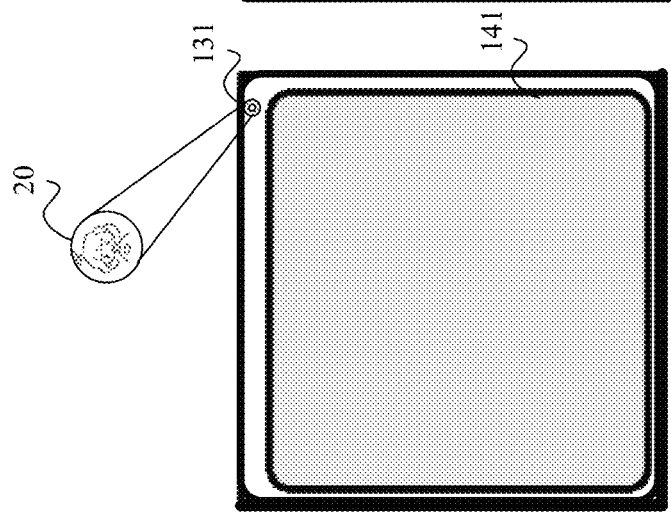
Figure 8A:
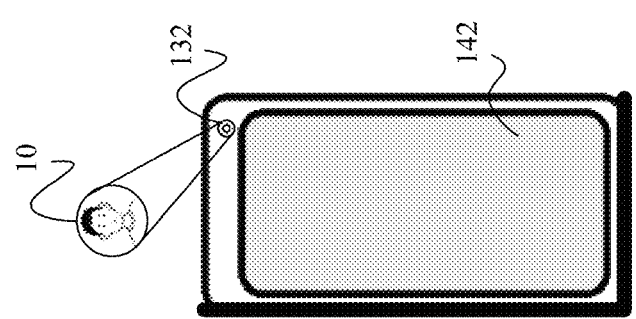

For example, as shown in FIG. 8A, an inner screen of an electronic device is in a closed state, and as shown in FIG. 8B or FIG. 8C, the inner screen of the electronic device is in an unfolded state. A first display screen 141 is an inner screen, a second display screen 142 is an outer screen, a first camera 131 is a front-facing camera, and a second camera 132 is a rear-facing camera. When the first display screen 141 of the electronic device is in a closed state, as shown in FIG. 8A, the first display screen 141 is in a locked state, and the second display screen 142 is in a black state. If an operation of turning on the outer screen is detected, the second display screen 142 is turned on, and the second camera 132 and a first timer are started, where timing duration of the first timer is first duration. Before the first timer expires, the second camera 132 captures a face image 10, and if the face image 10 is a face image matching a preset face image, the second display screen 142 is unlocked, a master mode is entered, the second camera 132 is closed, the first timer is stopped, and the user is prompted to perform face authentication by using the first camera 131 within second duration. After the user unfolds the first display screen 141, the first display screen 141 is in the unfolded state, and the electronic device locks and turns off the second display screen 142, and turns on the first display screen 141. Before the first timer expires, as shown in FIG. 8B, the first camera 131 captures a face image 20, but the face image 20 does not match the preset face image. In this case, the electronic device unlocks the first display screen 141, and enters a guest mode. Further, after the electronic device 10 unlocks the first display screen 141 and enters the guest mode, after the user folds the first display screen 141, the first display screen 141 is in the closed state. In this case, the electronic device automatically locks and turns off the first display screen 141, automatically turns on the second display screen 142, and enters the guest mode after being unlocked. This facilitates use by the user. For another example, before the first timer expires, as shown in FIG. 8C, if the first camera 131 captures the face image 10, the electronic device unlocks the first display screen 141 and enters the master mode. Further, after the electronic device 10 unlocks the first display screen 141 and enters the master mode, after the user folds the first display screen 141, the first display screen 141 is in the closed state. In this case, the electronic device automatically locks and turns off the first display screen 141, automatically turns on the second display screen 142, and enters the master mode after being unlocked.

However, when the first timer expires, if the first camera 131 still has not captured any face image, unlocking the first display screen 141 fails. The electronic device may prompt the user that unlocking the first display screen 141 fails. Further, the electronic device may further prompt the user to perform unlocking in another manner, or the like.

Therefore, according to the foregoing technical solution, when the master lends the electronic device of the master such as a mobile phone with a foldable screen to the guest, when an inner screen of the mobile phone is in a closed state, a rear-facing camera may be used to capture a face image of the master, thereby authorizing the guest to use the mobile phone. However, after the master uses the rear-facing camera to capture the face image of the master, an outer screen is unlocked, and a master mode can be entered. Therefore, to ensure security of privacy information, the master can unfold the mobile phone and lock the outer screen before lending the mobile phone to the guest. After the guest takes the mobile phone of the master, the guest may use a front-facing camera to capture a face image of the guest, and may unlock the inner screen of the mobile phone to enter a guest mode. Therefore, the privacy information of the master of the mobile phone is protected while the master and the guest may not need to memorize information such as passwords. This helps improve user experience.

It should be noted that before the electronic device detects an operation of unfolding the inner screen, and after the electronic device unlocks the outer screen and enters the master mode, the inner screen is still in the closed state, and the user may perform an operation on the electronic device to control the outer screen to perform corresponding displaying, that is, after the user unlocks the outer screen and enters the master mode, the user can use the electronic device normally. However, regardless of whether the electronic device detects an operation of unfolding the inner screen before the second timer expires or after the second timer expires, the outer screen is locked, and the user cannot normally use the outer screen. However, after the second timer expires, if the electronic device detects an operation of unfolding the inner screen, although the front-facing camera is started, if the face image captured by the front-facing camera does not match the preset face image, the inner screen may fail to be unlocked, and the guest mode cannot be entered.

Further, after performing step 609, the electronic device stores the face image captured by the front-facing camera in a first storage space. Therefore, after the inner screen is locked again, the guest can directly use the rear-facing camera or the front-facing camera to capture a face image of the guest, and can directly unlock the inner screen or the outer screen to enter the guest mode. This avoids a necessity of capturing a face image of the master again if the guest still needs to use the electronic device when the inner screen is locked during use of the electronic device.

Further, duration of caching the face image captured by the front-facing camera is preset duration. This helps improve security of the electronic device. For example, the preset duration is 30 days or 60 days. For example, after duration of caching the face image cached in the first storage space reaches preset duration, the electronic device may set the face image as invalid, and delete the invalid face image after the invalid face image reaches a threshold. For another example, after duration of caching the face image stored in the first storage space reaches the preset duration, the face image whose caching duration reaches the preset duration is deleted.

For example, the first storage space may be one or more storage spaces in at least one memory, such as an internal memory, a cache in a processor, or an external memory connected to an external memory interface. This is not limited.

For example, when the inner screen is in a locked and unfolded state, and the outer screen is in the locked and black state, the electronic device detects the user's operation of turning on the inner screen, and may turn on the inner screen in response to the user's operation of turning on the inner screen, and start the front-facing camera and a third timer, where timing duration of the third timer is third duration. Before the third timer expires, if the front-facing camera captures a face image, the front-facing camera is closed, the third timer is stopped, and whether the face image captured by the front-facing camera matches the preset face image is identified. If the face image captured by the front-facing camera matches the preset face image, whether any face image matching the face image captured by the front-facing camera is cached in the first storage space is further identified. When a face image matching the face image captured by the front-facing camera is cached in the first storage space, and duration of caching the face image does not exceed the preset duration, the inner screen is unlocked and the guest mode is entered.

For example, when the inner screen is in the unfolded state, the user's operation of turning on the inner screen may be an operation on a key such as the power key or the volume key, or may be a gesture operation, or may be a voice instruction. This is not limited. For example, the gesture operation may be an operation such as tapping, double-tapping, sliding, or pressing on the inner screen.

For example, an example in which the face image 10 shown in FIG. 8A is the preset face image is used. When the inner screen 141 of the electronic device is locked, as shown in FIG. 8B, if the front-facing camera 131 captures the face image 20, and a face image matching the face image 20 is cached in the first storage space, the inner screen 141 is unlocked, and the guest mode is entered.

Further, before the third timer expires, if the front-facing camera captures a face image matching the preset face image, the inner screen is unlocked, and the master mode is entered.

In addition, before the third timer expires, if the face image captured by the front-facing camera does not match the preset face image, and no face image matching the face image captured by the front-facing camera is cached in the first storage space, the user is prompted to use the rear-facing camera to perform master authorization, and the rear-facing camera and a fourth timer are started, where timing duration of the fourth timer is fourth duration. Before the fourth timer expires, if the rear-facing camera captures a face image, the rear-facing camera is closed, the fourth timer is stopped, and whether the face image captured by the rear-facing camera matches the preset face image is identified. If the face image captured by the rear-facing camera matches the preset face image, the inner screen is unlocked, and the guest mode is entered. It should be noted that, in this process, the outer screen may be always locked and black, or in response to capturing the face image that matches the preset face image by the rear-facing camera, the outer screen is unlocked, but the guest mode is entered. In other words, the rear-facing camera captures the face image matching the preset face images to implement master authorization, both the inner screen and the outer screen are unlocked to enter the guest mode. This helps improve security of the electronic device.

In other embodiments, when the fourth timer expires, if the rear-facing camera still has not captured any face image, the rear-facing camera is closed, and the user is prompted that unlocking the inner screen fails. Further, the electronic device may further prompt the user in another manner to perform unlocking, or the like.

After the electronic device unlocks the inner screen, enters the guest mode, and stores the face image captured by the front-facing camera in the first storage space, further, when the inner screen is locked again and is in the closed state, and the outer screen is black, the electronic device performs step 603 to identify that the face image captured by the rear-facing camera does not match the preset face image, and further identifies whether any face image matching the face image captured by the rear-facing camera exists among face images whose caching duration does not exceed the preset duration in the first memory. If no face image matching the face image captured by the rear-facing camera is cached in the first memory, step 610 is performed. For example, if a face image matching the face image captured by the rear-facing camera is cached in the first memory, the outer screen is unlocked, and the guest mode is entered.

Further, for a specific implementation in which the electronic device responds to the user's operation of unfolding the inner screen if detecting the user's operation of unfolding the inner screen after the electronic device unlocks the outer screen and enters the guest mode, refer to the manner in which the electronic device responds to the user's operation of unfolding the inner screen after the electronic device unlocks the outer screen and enters the master mode. Details are not described herein again.

Example 2

Figure 9:
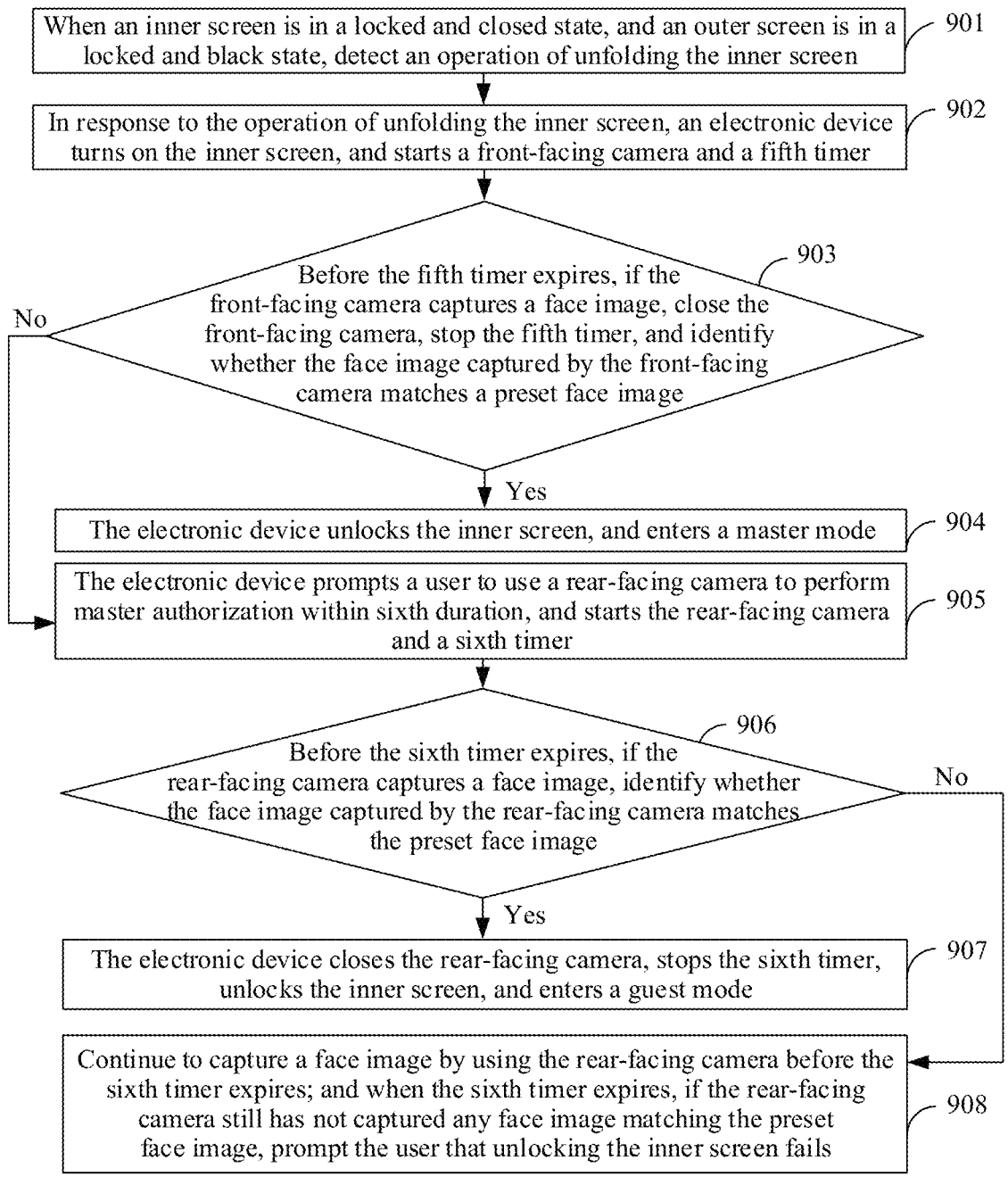
FIG. 9 is a schematic flowchart of another unlocking method according to an embodiment of this application.

FIG. 9 is a schematic flowchart of another unlocking method according to an embodiment of this application. The method specifically includes the following steps.

Step 901: When an inner screen is in a locked and closed state, and an outer screen is in a locked and black state, detect an operation of unfolding the inner screen.

Step 902: In response to the operation of unfolding the inner screen, an electronic device turns on the inner screen, and starts a front-facing camera and a fifth timer, where timing duration of the fifth timer is fifth duration.

In response to the operation of unfolding the inner screen, the outer screen may remain black and locked.

In addition, as a substitute step for step 901 and step 902, when the inner screen is in a locked and unfolded state and the outer screen is in the locked and black state, in response to the operation of turning on the inner screen, the electronic device turns on the inner screen, and starts the front-facing camera and the fifth timer, where the timing duration of the fifth timer is the fifth duration.

For example, a user's operation of turning on the inner screen may be an operation on a key such as a power key or a volume key, or may be a gesture operation, or may be a voice instruction. This is not limited. For example, the gesture operation may be an operation such as tapping, double-tapping, sliding, or pressing on the inner screen.

Step 903: Before the fifth timer expires, if the front-facing camera captures a face image, close the front-facing camera, stop the fifth timer, identify whether the face image captured by the front-facing camera matches a preset face image, and if yes, perform step 904, or if no, perform step 905.

Step 904: The electronic device unlocks the inner screen, and enters a master mode.

Step 905: The electronic device prompts the user to use a rear-facing camera to perform master authorization within sixth duration, and starts the rear-facing camera and a sixth timer, where timing duration of the sixth timer is the sixth duration.

Because the inner screen of the electronic device is in the unfolded state, the electronic device may display a corresponding prompt box on the inner screen to prompt the user to use the rear-facing camera to perform master authorization within the sixth duration. It should be noted that the outer screen remains black and locked.

Step 906: Before the sixth timer expires, if the rear-facing camera captures a face image, identify whether the face image captured by the rear-facing camera matches the preset face image, and if yes, perform step 907, or if no, perform step 908.

Step 907: The electronic device closes the rear-facing camera, stops the sixth timer, unlocks the inner screen, and enters a guest mode.

It should be noted that, in this embodiment of this application, when the rear-facing camera captures the face image matching the preset face image, the inner screen is turned on, but the outer screen is black. Therefore, the outer screen is not unlocked. When the outer screen is turned on, if the rear-facing camera captures the face image matching the preset face image, the outer screen is unlocked, and the master mode is entered.

Step 908: Continue to capture a face image by using the rear-facing camera before the sixth timer expires; and when the sixth timer expires, if the rear-facing camera still has not captured any face image matching the preset face image, prompt the user that unlocking the inner screen fails. Further, after the sixth timer expires, the rear-facing camera is closed.

Figure 10A:
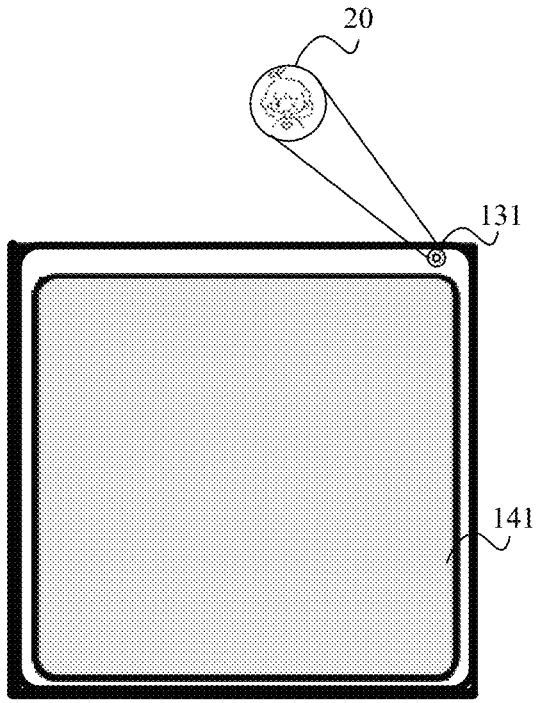
FIG. 10A to FIG. 10D are schematic diagrams of different physical forms of an electronic device according to an embodiment of this application.
Figure 10B:
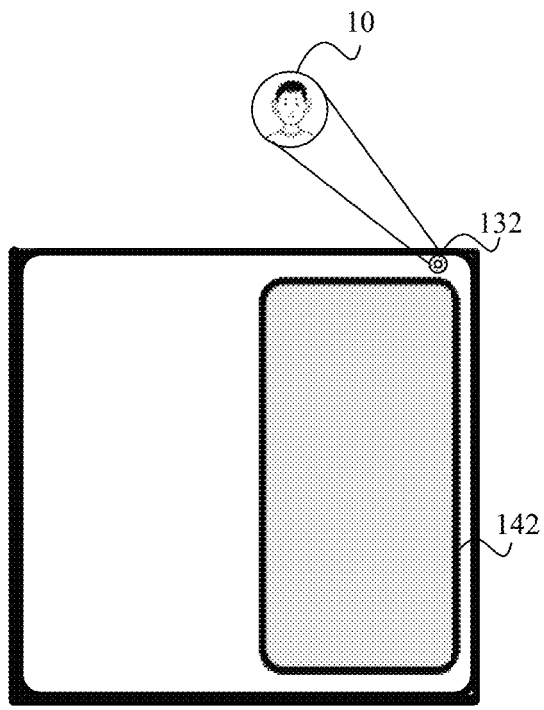

For example, as shown in FIG. 10A and FIG. 10B, a face image 10 is a preset face image, a first display screen 141 is an inner screen, a first camera 131 is a front-facing camera, a second display screen 142 is an outer screen, and a second camera 132 is a rear-facing camera. FIG. 10A is a schematic diagram of a front side when the inner screen is in an unfolded state, and FIG. 10B is a schematic diagram of a back side when the inner screen is in the unfolded state. When the first display screen 141 is locked and is in the unfolded state, and the second display screen is locked and black, the first camera 131 captures a face image 20, and starts a sixth timer and the second camera 132. Before the sixth timer expires, if the second camera 132 captures the face image 10, the first display screen 141 is unlocked, and a guest mode is entered. The second display screen 142 remains black. Therefore, privacy information of a master on a mobile phone is protected while the master and a guest may not need to memorize information such as passwords. This helps improve user experience.

Figure 10C:
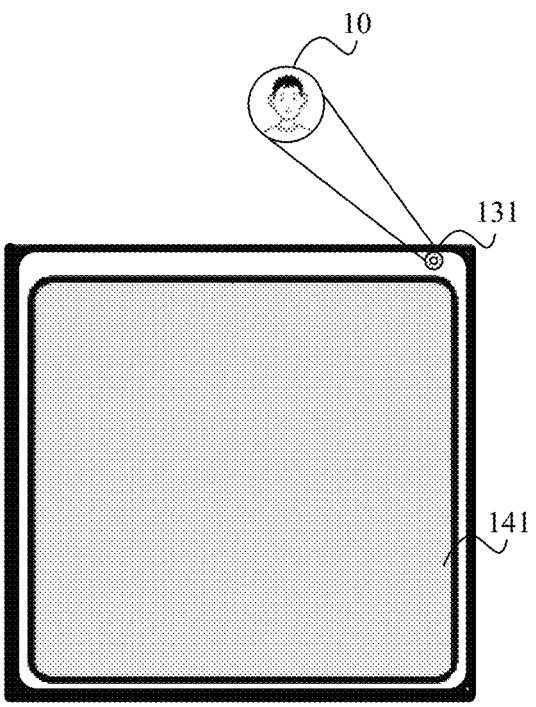
Figure 10D:
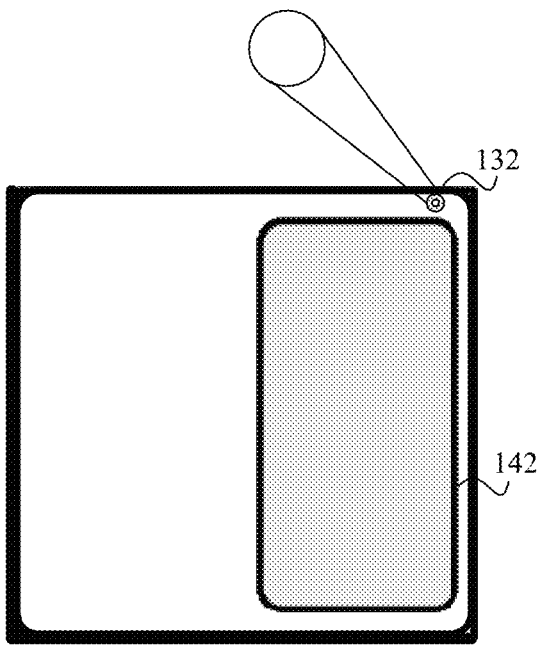

For another example, as shown in FIG. 10C and FIG. 10D, a face image 10 is a preset face image, a first display screen 141 is an inner screen, a first camera 131 is a front-facing camera, a second display screen 142 is an outer screen, and a second camera 132 is a rear-facing camera. FIG. 10C is a schematic diagram of a front side when the inner screen is in an unfolded state, and FIG. 10D is a schematic diagram of a back side when the inner screen is in the unfolded state. When the first display screen 141 is locked and is in the unfolded state, and the second display screen is locked and black, if the first camera 131 captures the face image 10, the first display screen 141 is unlocked, and a master mode is entered. For example, the second display screen 142 may remain black.

Figure 3B:
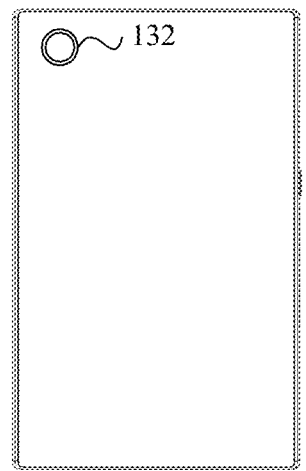

The following describes an unlocking method in an embodiment of this application by using an electronic device with an unfoldable screen (for example, the electronic device shown in FIG. 3A and FIG. 3B) as an example. As shown in FIG. 3A and FIG. 3B, the electronic device includes a first display screen 141, a first camera 131, and a second camera 132. The first display screen 141 and the first camera 131 are located on a front side of the electronic device, and the second camera 132 is located on a back side of the electronic device. Hereinafter the first display screen 141 is referred to as a display screen, the first camera 131 is referred to as a front-facing camera, and the second camera is referred to as a rear-facing camera.

Example 3

Figure 11:
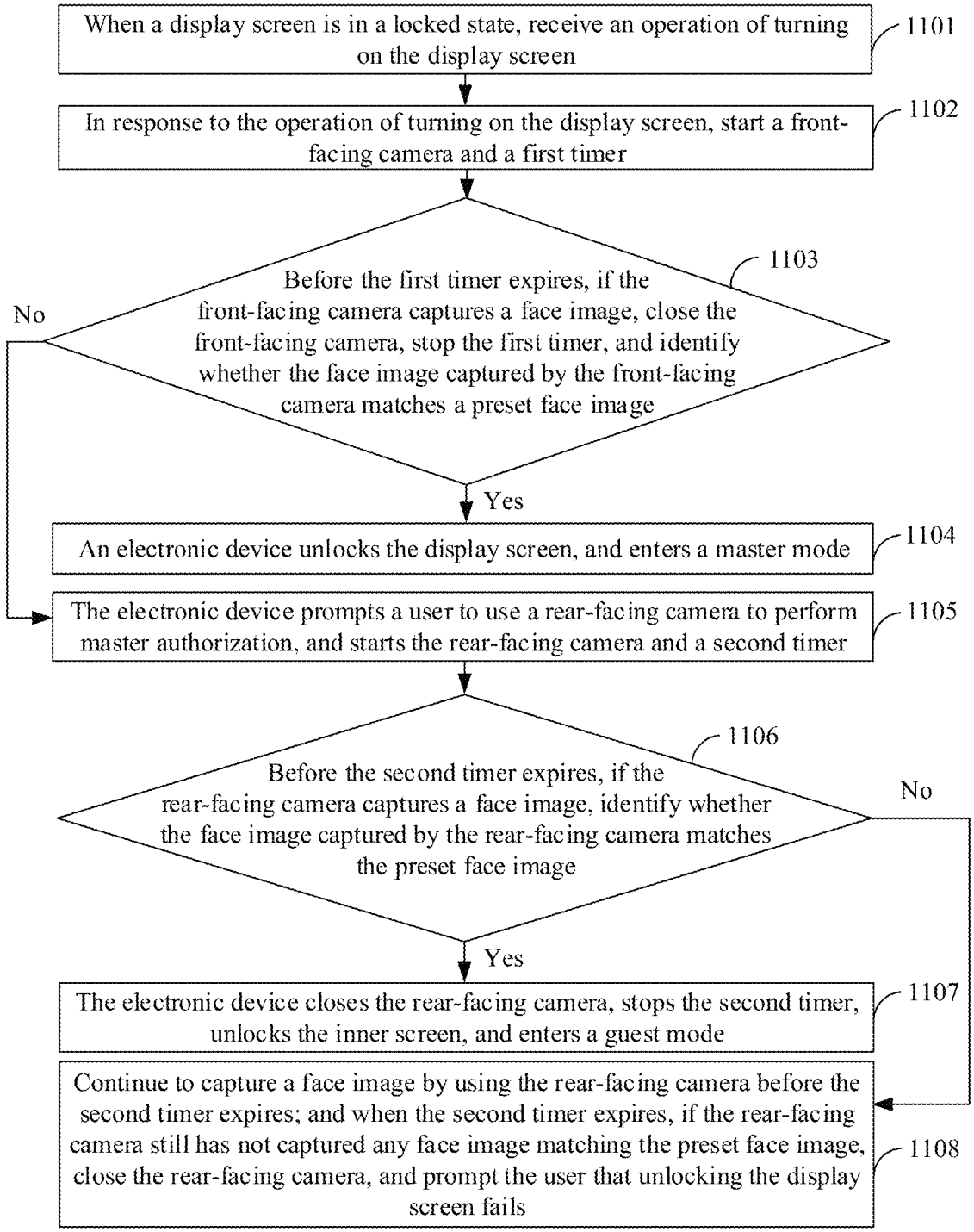
FIG. 11 is a schematic flowchart of another unlocking method according to an embodiment of this application.

FIG. 11 is a schematic flowchart of another unlocking method according to an embodiment of this application. The method specifically includes the following steps.

Step 1101: When a display screen is in a locked state, detect an operation of turning on the display screen. The display screen being in the locked state may also be expressed as the display screen being locked.

For example, a user's operation of turning on the display screen may be an operation on a key such as a power key or a volume key, or may be a gesture operation, or may be a voice instruction. This is not limited. For example, the gesture operation may be an operation such as tapping, double-tapping, sliding, or pressing on the display screen.

Step 1102: In response to the operation of turning on the display screen, start a front-facing camera and a first timer, where timing duration of the first timer is first duration.

It should be noted that the timing duration of the first timer may be a default value of a system, or may be preset based on a user requirement, for example, 15 seconds or 20 seconds. This is not limited.

Step 1103: Before the first timer expires, if the front-facing camera captures a face image, close the front-facing camera, stop the first timer, identify whether the face image captured by the front-facing camera matches a preset face image, and if yes, perform step 1104, or if no, perform step 1105.

For example, for related descriptions of the preset face image, refer to related descriptions in the example 1. Details are not described herein again.

Step 1104: An electronic device unlocks the display screen, and enters a master mode.

Step 1105: The electronic device prompts the user to use a rear-facing camera to perform master authorization, and starts the rear-facing camera and a second timer, where timing duration of the second timer is second duration. For example, the second duration may be the same as or different from the first duration.

Step 1106: Before the second timer expires, if the rear-facing camera captures a face image, identify whether the face image captured by the rear-facing camera matches the preset face image, and if yes, perform step 1107, or if no, perform step 1108.

Step 1107: The electronic device closes the rear-facing camera, stops the second timer, unlocks the display screen, and enters a guest mode.

Step 1108: Continue to capture a face image by using the rear-facing camera before the second timer expires; and when the second timer expires, if the rear-facing camera still has not captured any face image matching the preset face image, close the rear-facing camera, and prompt the user that unlocking the display screen fails.

In some embodiments, when the first timer expires, if the front-facing camera still has not captured any face image, the front-facing camera is closed. Alternatively, when the first timer expires, if the front-facing camera still has not captured any face image, the user is prompted whether to keep the front-facing camera on. The user can continue to keep the front-facing camera on or close the front-facing camera as required.

Further, when the electronic device performs step 1103 to identify that the face image captured by the front-facing camera does not match the preset face image, the electronic device identifies whether any face image matching the face image captured by the front-facing camera is cached in a first storage space. When no face image matching the face image captured by the front-facing camera is cached in the first storage space, step 1105 is performed. After performing step 1107, the electronic device may further store the face image captured by the front-facing camera in the first storage space. Therefore, after the inner screen is locked again, a guest can directly use the front-facing camera to capture a face image of the guest, and can directly unlock the display screen to enter the guest mode. This avoids a necessity of capturing a face image of a master again if the guest still needs to use the electronic device when the inner screen is locked during use of the electronic device. For example, duration of caching the face image captured by the front-facing camera is preset duration. For a related implementation, refer to related descriptions in the example 1. Details are not described herein again.

For related descriptions of the first storage space, refer to the descriptions of the first storage space in the example 1. Details are not described herein again.

For example, if the face image captured by the front-facing camera is stored in the first storage space, the display screen is unlocked, and the guest mode is entered.

Figure 12:
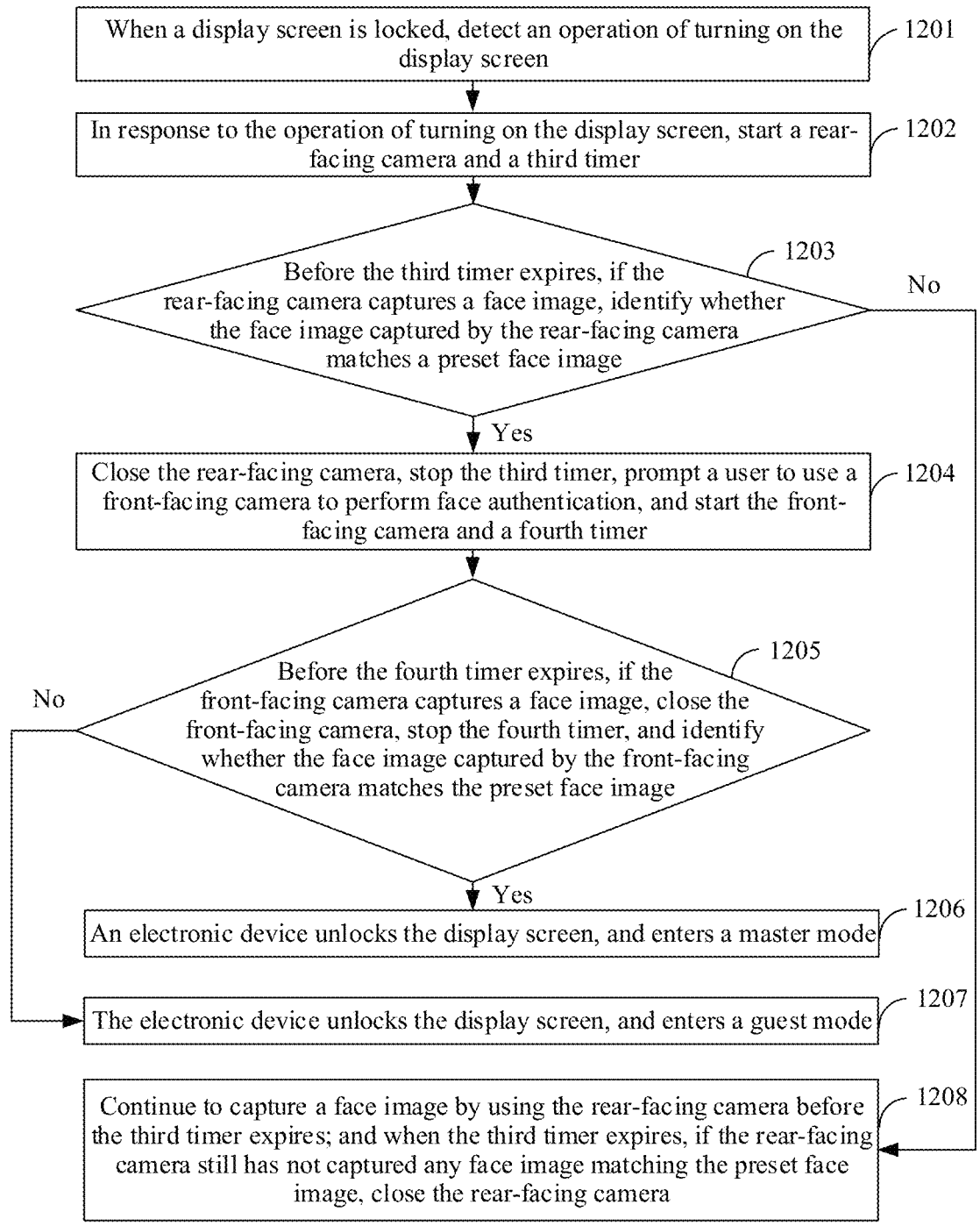
FIG. 12 is a schematic flowchart of another unlocking method according to an embodiment of this application.

Example 4: When a display screen is in a locked state, an operation of turning on the display screen is detected, and in response to the operation of turning on the display screen, a rear-facing camera may also be started, but a front-facing camera is not started. In this scenario, for example, FIG. 12 is a schematic flowchart of still another unlocking method according to an embodiment of this application. The method specifically includes the following steps.

Step 1201: When a display screen is in a locked state, detect an operation of turning on the display screen.

Step 1202: In response to the operation of turning on the display screen, start a rear-facing camera and a third timer, where timing duration of the third timer is third duration.

Step 1203: Before the third timer expires, if the rear-facing camera captures a face image, identify whether the face image captured by the rear-facing camera matches a preset face image, and if yes, perform step 1204, or if no, perform step 1208.

Step 1204: An electronic device closes the rear-facing camera, stops the third timer, prompts a user to use a front-facing camera to perform face authentication, and starts the front-facing camera and a fourth timer, where timing duration of the fourth timer is fourth duration.

Step 1205: Before the fourth timer expires, if the front-facing camera captures a face image, close the front-facing camera, stop the fourth timer, identify whether the face image captured by the front-facing camera matches the preset face image, and if yes, perform step 1206, or if no, perform step 1207.

Step 1206: The electronic device unlocks the display screen, and enters a master mode.

Step 1207: The electronic device unlocks the display screen, and enters a guest mode.

Step 1208: Before the third timer expires, continue to capture a face image by using the rear-facing camera, and when the third timer expires, if the rear-facing camera still has not captured any face image matching the preset face image, close the rear-facing camera.

As a substitute step for step 1208, when the third timer expires, if the rear-facing camera still has not captured any face image matching the preset face image, the user may be further prompted whether to keep the rear-facing camera on, prompt the user to unlock the display screen in another manner, or the like.

To be specific, in the example 4, a master may capture a face image of the master by using the rear-facing camera of the electronic device, and then lend the electronic device to a guest for use. After taking the electronic device, the guest may capture a face image of the guest by using the front-facing camera within the second duration, thereby unlocking the display screen, and entering the guest mode. Therefore, the user does not need to memorize a password while privacy information of the master of the electronic device is protected.

It should be understood that the foregoing embodiments of this application may be used separately, or may be used in combination with each other. This is not limited.

In the foregoing embodiments provided in this application, the methods provided in the embodiments of this application are described from a perspective of the electronic device and a third-party device used as execution bodies. To implement the functions in the methods provided in the embodiments of this application, the electronic device may include a hardware structure and/or a software module, and implement the foregoing functions in a form of a hardware structure, a software module, or a hardware structure and a software module. Whether one of the foregoing functions is performed in the manner of a hardware structure, a software module, or a hardware structure and a software module depends on a specific application and design constraints of the technical solutions.

Figure 13:
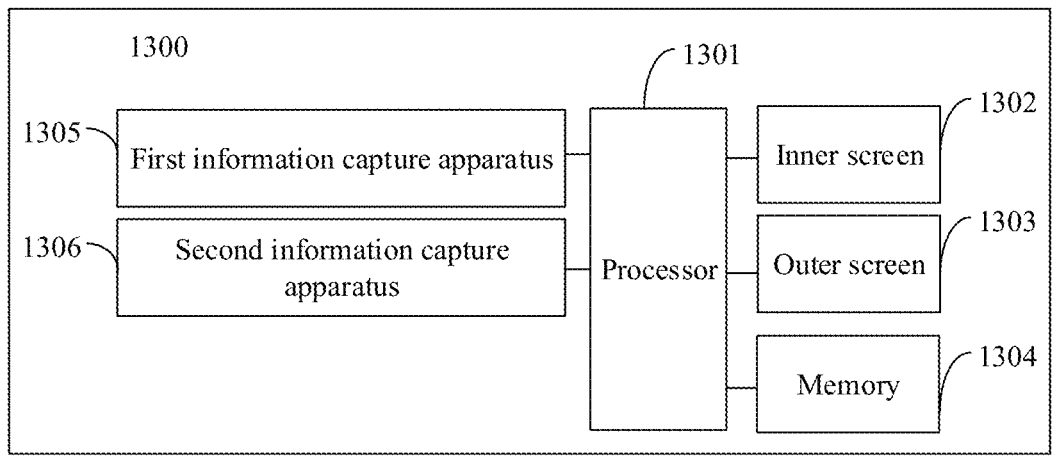
FIG. 13 is a schematic structural diagram of another electronic device according to an embodiment of this application.

FIG. 13 shows an electronic device 1300 provided in this application. The electronic device 1300 includes at least one processor 1301, an inner screen 1302, an outer screen 1303, a memory 1304, a first information capture apparatus 1305, and a second information capture apparatus 1306. The processor 1301 is coupled to the inner screen 1302, the outer screen 1303, the memory 1304, the first information capture apparatus 1305, and the second information capture apparatus 1306. In this embodiment of this application, the coupling is an indirect coupling or communication connection between apparatuses, units, or modules, and may be in electrical, mechanical, or other forms used for information exchange between the apparatuses, units, or modules. Connection media between the processor 1301 and the inner screen 1302, the outer screen 1303, the memory 1304, the first information capture apparatus 1305, and the second information capture apparatus 1306 are not limited in this embodiment of this application. For example, in this embodiment of this application, the processor 1301 in FIG. 13 may be connected to the inner screen 1302, the outer screen 1303, the memory 1304, the first information capture apparatus 1305, and the second information capture apparatus 1306 by using a bus. The bus may be classified into an address bus, a data bus, a control bus, and the like.

Specifically, the memory 1304 is configured to store one or more computer programs, and the one or more computer programs include instructions. The first information capture apparatus 1305 and the inner screen 1302 are located on one side of the electronic device 1300. For example, the first information capture apparatus 1305 and the inner screen 1302 are located on a front side of the electronic device 1300, and the first information capture apparatus 1305 may be a front-facing camera. The second information capture apparatus 1306 and the outer screen 1303 are located on another side of the electronic device 1300. For example, the first information capture apparatus 1305 and the inner screen 1302 are located on a back side of the electronic device 1300, and the second information capture apparatus 1306 may be a rear-facing camera.

The processor 1301 is configured to invoke the instructions stored in the memory 1304, so that the electronic device 1300 performs the unlocking method shown in FIG. 6 or FIG. 9.

Figure 14:
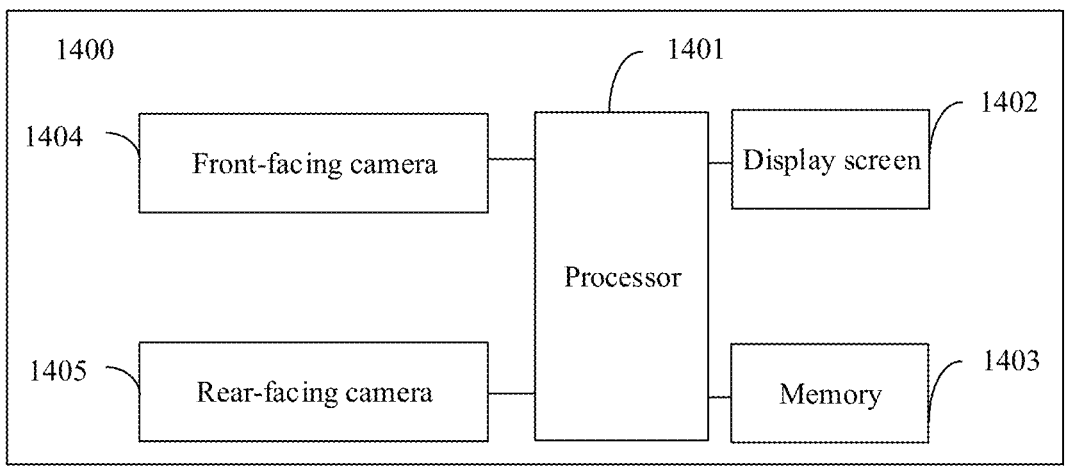
FIG. 14 is a schematic structural diagram of another electronic device according to an embodiment of this application.

FIG. 14 shows an electronic device 1400 provided in this application. The electronic device 1400 includes at least one processor 1401, a display screen 1402, a memory 1403, a front-facing camera 1404, and a rear-facing camera 1405. The processor 1401 is coupled to the display screen 1402, the memory 1403, the front-facing camera 1404, and the rear-facing camera 1405. The coupling in this embodiment of this application is an indirect coupling or communication connection between apparatuses, units, or modules, and may be in electrical, mechanical, or other forms used for information exchange between the apparatuses, units, or modules. Connection media between the processor 1401 and the display screen 1402, the memory 1403, the front-facing camera 1404, and the rear-facing camera 1405 are not limited in this embodiment of this application. For example, in this embodiment of this application, in FIG. 14, the processor 1401 may be connected to the display screen 1402, the memory 1403, the front-facing camera 1404, and the rear-facing camera 1405 by using a bus. The bus may be classified into an address bus, a data bus, a control bus, and the like.

Specifically, the memory 1403 is configured to store one or more computer programs, and the one or more computer programs include instructions.

The processor 1401 is configured to invoke the instructions stored in the memory 1403, so that the electronic device 1400 performs the unlocking method shown in FIG. 11 or FIG. 12.

In the embodiments of this application, the processor 1301 or the processor 1401 may be a general-purpose processor, a digital signal processor, an application-specific integrated circuit, a field programmable gate array or another programmable logic device, a discrete gate or a transistor logic device, or a discrete hardware component, and may implement or perform the methods, steps, and logical block diagrams disclosed in the embodiments of this application. The general-purpose processor may be a microprocessor or any conventional processor or the like. Steps of the methods disclosed with reference to the embodiments of this application may be directly performed and completed by using a hardware processor, or may be performed and completed by using a combination of hardware in a processor and a software module.

In the embodiments of this application, the memory 1304 or the memory 1403 may be a non-volatile memory, for example, a hard disk drive (HDD) or a solid state drive (SSD), or may be a volatile memory, such as a random access memory (RAM). The memory is any other medium that can be used to carry or store desired program code in a form of instructions or a data structure and can be accessed by a computer, but is not limited thereto. The memory in the embodiments of this application may alternatively be a circuit or any other apparatus that can implement a storage function, and is configured to store program instructions and/or data.

It should be understood that the electronic device 1300 and the electronic device 1400 may be configured to implement the unlocking methods in the embodiments of this application. For related features, refer to the foregoing descriptions. Details are not described herein again.

A person skilled in the art may clearly understand that the embodiments of this application may be implemented by hardware, or firmware, or a combination thereof. When implemented by software, the foregoing functions may be stored in a computer-readable medium or transmitted as one or more instructions or code in a computer-readable medium. The computer-readable medium includes a computer storage medium and a communications medium, where the communications medium includes any medium that enables a computer program to be transmitted from one place to another place. The storage medium may be any usable medium accessible to a computer. As an example rather than a limitation, the computer-readable medium may include a RAM, a ROM, an electrically erasable programmable read-only memory (EEPROM), a compact disc read-only memory (CD-ROM) or another optical disc storage, a magnetic disk storage medium or another magnetic storage device, or any other medium that can be used to carry or store desired program code in a form of instructions or a data structure and can be accessed by a computer. In addition, any connection may be appropriately a computer-readable medium. For example, if software is transmitted from a website, a server, or another remote source by using a coaxial cable, a fiber optic cable, a twisted pair, a digital subscriber line (DSL), or a wireless technology such as infrared, radio, or microwave, the coaxial cable, the fiber optic cable, the twisted pair, the DSL, or the wireless technology such as infrared, radio, or microwave is included in fixation of the medium to which it belongs. For example, a disk and a disc used in the embodiments of this application include a compact disc (CD), a laser disc, an optical disc, a digital versatile disc (digital video disc, DVD), a floppy disk, and a Blu-ray disc, where the disk generally magnetically copies data, while the disc optically copies data by using a laser. The foregoing combination should also be included in the protection scope of the computer-readable medium.

In summary, the foregoing descriptions are merely the embodiments of this specification, and are not intended to limit the protection scope of this application. Any modification, equivalent replacement, improvement, and the like based on the disclosure of this application shall fall within the protection scope of this application.

What is claimed is:

1. An unlocking method, applied to an electronic device, wherein the electronic device comprises an inner screen, an outer screen, a front-facing camera, and a rear-facing camera, the inner screen is a foldable screen, the inner screen and the front-facing camera are located on one side of the electronic device, the outer screen and the rear-facing camera are located on another side of the electronic device, and the method comprises:

in response to the inner screen being in a locked and closed state, and the outer screen being in a locked and black state, detecting an operation of turning on the outer screen;

in response to the operation of turning on the outer screen, turning on the outer screen, starting the rear-facing camera, and starting a first timer, wherein timing duration of the first timer is first duration;

before the first timer expires, in response to the rear-facing camera capturing a face image, identifying whether the face image captured by the rear-facing camera matches a preset face image;

in response to the face image captured by the rear-facing camera matching the preset face image, unlocking the outer screen, entering a master mode, closing the rear-facing camera, stopping the first timer, prompting a user to use the front-facing camera to perform face authentication within second duration, and starting a second timer, wherein timing duration of the second timer is the second duration, and in the master mode, the electronic device allows access to all information stored in the electronic device;

detecting an operation of unfolding the inner screen;

in response to the operation of unfolding the inner screen, turning on the inner screen, starting the front-facing camera, and locking the outer screen;

before the second timer expires, in response to the front-facing camera capturing a face image, closing the front-facing camera, stopping the second timer, and identifying whether the face image captured by the front-facing camera matches the preset face image; and in response to the face image captured by the front-facing camera not matching the preset face image, unlocking the inner screen, and entering a guest mode, wherein in the guest mode, the electronic device only allows access to information with unrestricted access permissions stored in the electronic device; or in response to the face image captured by the front-facing camera matching the preset face image, unlocking the inner screen, and entering the master mode; or in response to an expiration of the second timer, and the front-facing camera still having not captured any face image, prompting the user that unlocking the inner screen fails.

2. The method according to claim 1, further comprising:
in response to the face image captured by the rear-facing camera not matching the preset face image, continuing to capture a face image by using the rear-facing camera before the first timer expires; and in response to an expiration of the first timer, and the rear-facing camera still having not captured any face image matching the preset face image, closing the rear-facing camera.

3. The method according to claim 2, wherein after the unlocking the inner screen, and entering the guest mode in response to the face image captured by the front-facing camera not matching the preset face image, the method further comprises:

caching the face image captured by the front-facing camera in a first storage space.

4. The method according to claim 3, further comprising:
in response to the inner screen being in a locked and unfolded state, and the outer screen being in the locked and black state, detecting the user's operation of turning on the inner screen;

in response to the user's operation of turning on the inner screen, turning on the inner screen, and starting the front-facing camera and a third timer, wherein timing duration of the third timer is third duration;

before the third timer expires, in response to the front-facing camera capturing a face image, closing the front-facing camera, stopping the third timer, and identifying whether the image captured by the front-facing camera matches the preset face image;

in response to the face image captured by the front-facing camera matching the preset face image, unlocking the inner screen, and entering the master mode; or in response to the face image captured by the front-facing camera not matching the preset face image, determining whether any face image matching the face image captured by the front-facing camera is cached in the first storage space;

in response to a face image matching the face image captured by the front-facing camera being cached in the first storage space, unlocking the inner screen, and entering the guest mode; or in response to no face image matching the face image captured by the front-facing camera being cached in the first storage space, prompting the user to use the rear-facing camera to perform master authorization within fourth duration, and starting the rear-facing camera and a fourth timer, wherein timing duration of the fourth timer is the fourth duration;

before the fourth timer expires, in response to the rear-facing camera capturing a face image, identifying whether the face image captured by the rear-facing camera matches the preset face image; and in response to the face image captured by the rear-facing camera matching the preset face image, closing the rear-facing camera, stopping the fourth timer, unlocking the inner screen, and entering the guest mode; or in response to the face image captured by the rear-facing camera not matching the preset face image, continuing to capture a face image by using the rear-facing camera before the fourth timer expires; and in response to an expiration of the fourth timer, and the rear-facing camera still having not captured any face image matching the preset face image, closing the rear-facing camera, and prompting the user that unlocking the inner screen fails.

5. The method according to claim 1, wherein after the unlocking the inner screen, and entering the guest mode in response to the face image captured by the front-facing camera not matching the preset face image, the method further comprises:

caching the face image captured by the front-facing camera in a first storage space.

6. The method according to claim 5, wherein the method further comprises:

in response to the inner screen being in a locked and unfolded state, and the outer screen being in the locked and black state, detecting the user's operation of turning on the inner screen;

in response to the user's operation of turning on the inner screen, turning on the inner screen, and starting the front-facing camera and a third timer, wherein timing duration of the third timer is third duration;

before the third timer expires, in response to the front-facing camera capturing a face image, closing the front-facing camera, stopping the third timer, and identifying whether the image captured by the front-facing camera matches the preset face image;

in response to the face image captured by the front-facing camera matching the preset face image, unlocking the inner screen, and entering the master mode; or in response to the face image captured by the front-facing camera not matching the preset face image, determining whether any face image matching the face image captured by the front-facing camera is cached in the first storage space;

in response to a face image matching the face image captured by the front-facing camera being cached in the first storage space, unlocking the inner screen, and entering the guest mode; or in response to no face image matching the face image captured by the front-facing camera being cached in the first storage space, prompting the user to use the rear-facing camera to perform master authorization within fourth duration, and starting the rear-facing camera and a fourth timer, wherein timing duration of the fourth timer is the fourth duration;

before the fourth timer expires, in response to the rear-facing camera capturing a face image, identifying whether the face image captured by the rear-facing camera matches the preset face image; and in response to the face image captured by the rear-facing camera matching the preset face image, closing the rear-facing camera, stopping the fourth timer, unlocking the inner screen, and entering the guest mode; or in response to the face image captured by the rear-facing camera not matching the preset face image, continuing to capture a face image by using the rear-facing camera before the fourth timer expires; and in response to an expiration of the fourth timer, and the rear-facing camera still having not captured any face image matching the preset face image, closing the rear-facing camera, and prompting the user that unlocking the inner screen fails.

7. An unlocking method, applied to an electronic device, wherein the electronic device comprises an inner screen, an outer screen, a front-facing camera, and a rear-facing camera, the inner screen is a foldable screen, the inner screen and the front-facing camera are located on one side of the electronic device, the outer screen and the rear-facing camera are located on another side of the electronic device, and the method comprises:

in response to the inner screen being in a locked and closed state, and the outer screen being in a locked and black state, detecting an operation of unfolding the inner screen;

in response to the operation of unfolding the inner screen, turning on the inner screen, starting the front-facing camera, and starting a first timer, wherein timing duration of the first timer is first duration;

before the first timer expires, in response to the front-facing camera capturing a face image, closing the front-facing camera, stopping the first timer, and identifying whether the face image captured by the front-facing camera matches a preset face image;

in response to the face image captured by the front-facing camera matching the preset face image, unlocking the inner screen, and entering a master mode; or in response to the face image captured by the front-facing camera not matching the preset face image, prompting a user to use the rear-facing camera to perform master authorization within second duration, and starting the rear-facing camera and a second timer, wherein timing duration of the second timer is the second duration, and in the master mode, the electronic device allows access to all information stored in the electronic device;

before the second timer expires, in response to the rear-facing camera capturing a face image, identifying whether the face image captured by the rear-facing camera matches the preset face image; and in response to the face image captured by the rear-facing camera matching the preset face image, closing the rear-facing camera, stopping the second timer, unlocking the inner screen, and entering a guest mode, wherein in the guest mode, the electronic device only allows access to information with unrestricted access permissions stored in the electronic device; or in response to the face image captured by the rear-facing camera not matching the preset face image, continuing to capture a face image by using the rear-facing camera before the second timer expires; and in response to an expiration of the second timer, and the rear-facing camera still having not captured any face image matching the preset face image, closing the rear-facing camera, and prompting the user that unlocking the inner screen fails.

8. The method according to claim 7, further comprising:

in response to the face image captured by the rear-facing camera not matching the preset face image, continuing to capture a face image by using the rear-facing camera before the first timer expires; and in response to an expiration of the first timer, and the rear-facing camera still having not captured any face image matching the preset face image, closing the rear-facing camera.

9. The method according to claim 8, wherein after the unlocking the inner screen, and entering the guest mode in response to the face image captured by the front-facing camera not matching the preset face image, the method further comprises:

caching the face image captured by the front-facing camera in a first storage space.

10. The method according to claim 9, further comprising:

in response to the inner screen being in a locked and unfolded state, and the outer screen is in the locked and black state, detecting the user's operation of turning on the inner screen;

in response to the user's operation of turning on the inner screen, turning on the inner screen, and starting the front-facing camera and a third timer, wherein timing duration of the third timer is third duration;

before the third timer expires, in response to the front-facing camera capturing a face image, closing the front-facing camera, stopping the third timer, and identifying whether the image captured by the front-facing camera matches the preset face image;

in response to the face image captured by the front-facing camera matching the preset face image, unlocking the inner screen, and entering the master mode; or in response to the face image captured by the front-facing camera not matching the preset face image, determining whether any face image matching the face image captured by the front-facing camera is cached in the first storage space;

in response to a face image matching the face image captured by the front-facing camera being cached in the first storage space, unlocking the inner screen, and entering the guest mode; or in response to no face image matching the face image captured by the front-facing camera being cached in the first storage space, prompting the user to use the rear-facing camera to perform master authorization within fourth duration, and starting the rear-facing camera and a fourth timer, wherein timing duration of the fourth timer is the fourth duration;

before the fourth timer expires, in response to the rear-facing camera capturing a face image, identifying whether the face image captured by the rear-facing camera matches the preset face image; and in response to the face image captured by the rear-facing camera matching the preset face image, closing the rear-facing camera, stopping the fourth timer, unlocking the inner screen, and entering the guest mode; or in response to the face image captured by the rear-facing camera not matching the preset face image, continuing to capture a face image by using the rear-facing camera before the fourth timer expires; and in response to an expiration the fourth timer, and the rear-facing camera still having not captured any face image matching the preset face image, closing the rear-facing camera, and prompting the user that unlocking the inner screen fails.

11. The method according to claim 7, wherein after the unlocking the inner screen, and entering the guest mode in response to the face image captured by the front-facing camera not matching the preset face image, the method further comprises:

caching the face image captured by the front-facing camera in a first storage space.

12. The method according to claim 11, further comprising:

in response to the inner screen being in a locked and unfolded state, and the outer screen being in the locked and black state, detecting the user's operation of turning on the inner screen;

in response to the user's operation of turning on the inner screen, turning on the inner screen, and starting the front-facing camera and a third timer, wherein timing duration of the third timer is third duration;

before the third timer expires, in response to the front-facing camera capturing a face image, closing the front-facing camera, stopping the third timer, and identifying whether the image captured by the front-facing camera matches the preset face image;

in response to the face image captured by the front-facing camera matching the preset face image, unlocking the inner screen, and entering the master mode; or in response to the face image captured by the front-facing camera not matching the preset face image, determining whether any face image matching the face image captured by the front-facing camera is cached in the first storage space;

in response to a face image matching the face image captured by the front-facing camera being cached in the first storage space, unlocking the inner screen, and entering the guest mode; or in response to no face image matching the face image captured by the front-facing camera being cached in the first storage space, prompting the user to use the rear-facing camera to perform master authorization within fourth duration, and starting the rear-facing camera and a fourth timer, wherein timing duration of the fourth timer is the fourth duration;

before the fourth timer expires, in response to the rear-facing camera capturing a face image, identifying whether the face image captured by the rear-facing camera matches the preset face image; and in response to the face image captured by the rear-facing camera matching the preset face image, closing the rear-facing camera, stopping the fourth timer, unlocking the inner screen, and entering the guest mode; or in response to the face image captured by the rear-facing camera not matching the preset face image, continuing to capture a face image by using the rear-facing camera before the fourth timer expires; and in response to an expiration of the fourth timer, and the rear-facing camera still having not captured any face image matching the preset face image, closing the rear-facing camera, and prompting the user that unlocking the inner screen fails.

13. An electronic device comprising:

an inner screen, an outer screen, a front-facing camera, and a rear-facing camera, wherein the inner screen is a foldable screen, the inner screen and the front-facing camera are located on one side of the electronic device, and the outer screen and the rear-facing camera are located on another side of the electronic device;

one or more processors;

a memory; and one or more computer programs, wherein the one or more computer programs are stored in the memory, the one or more computer programs comprise instructions which are executed by the electronic device and cause the electronic device to perform operations including:

in response to the inner screen being in a locked and closed state, and the outer screen being in a locked and black state, detecting an operation of turning on the outer screen;

in response to the operation of turning on the outer screen, turning on the outer screen, starting the rear-facing camera, and starting a first timer, wherein timing duration of the first timer is first duration;

before the first timer expires, in response to the rear-facing camera capturing a face image, identifying whether the face image captured by the rear-facing camera matches a preset face image;

in response to the face image captured by the rear-facing camera matching the preset face image, unlocking the outer screen, entering a master mode, closing the rear-facing camera, stopping the first timer, prompting a user to use the front-facing camera to perform face authentication within second duration, and starting a second timer, wherein timing duration of the second timer is the second duration, and in the master mode, the electronic device allows access to all information stored in the electronic device;

detecting an operation of unfolding the inner screen;

in response to the operation of unfolding the inner screen, turning on the inner screen, starting the front-facing camera, and locking the outer screen;

before the second timer expires, in response to the front-facing camera capturing a face image, closing the front-facing camera, stopping the second timer, and identifying whether the face image captured by the front-facing camera matches the preset face image; and in response to the face image captured by the front-facing camera not matching the preset face image, unlocking the inner screen, and entering a guest mode, wherein in the guest mode, the electronic device only allows access to information with unrestricted access permissions stored in the electronic device; or in response to the face image captured by the front-facing camera matching the preset face image, unlocking the inner screen, and entering the master mode; or in response to an expiration of the second timer, and the front-facing camera still having not captured any face image, prompting the user that unlocking the inner screen fails.

14. The electronic device according to claim 13, wherein the operations further comprise:

in response to the face image captured by the rear-facing camera not matching the preset face image, continuing to capture a face image by using the rear-facing camera before the first timer expires; and in response to an expiration of the first timer, and the rear-facing camera still having not captured any face image matching the preset face image, closing the rear-facing camera.

15. The electronic device according to claim 14, wherein the operations further comprise:

after the unlocking the inner screen, and entering the guest mode in response to the face image captured by the front-facing camera not matching the preset face image, caching the face image captured by the front-facing camera in a first storage space.

16. The electronic device according to claim 15, wherein the operations further comprises:

in response to the inner screen being in a locked and unfolded state, and the outer screen being in the locked and black state, detecting the user's operation of turning on the inner screen;

in response to the user's operation of turning on the inner screen, turning on the inner screen, and starting the front-facing camera and a third timer, wherein timing duration of the third timer is third duration;

before the third timer expires, in response to the front-facing camera capturing a face image, closing the front-facing camera, stopping the third timer, and identifying whether the image captured by the front-facing camera matches the preset face image;

in response to the face image captured by the front-facing camera matching the preset face image, unlocking the inner screen, and entering the master mode; or in response to the face image captured by the front-facing camera not matching the preset face image, determining whether any face image matching the face image captured by the front-facing camera is cached in the first storage space;

in response to a face image matching the face image captured by the front-facing camera being cached in the first storage space, unlocking the inner screen, and entering the guest mode; or in response to no face image matching the face image captured by the front-facing camera being cached in the first storage space, prompting the user to use the rear-facing camera to perform master authorization within fourth duration, and starting the rear-facing camera and a fourth timer, wherein timing duration of the fourth timer is the fourth duration;

before the fourth timer expires, in response to the rear-facing camera capturing a face image, identifying whether the face image captured by the rear-facing camera matches the preset face image; and in response to the face image captured by the rear-facing camera matching the preset face image, closing the rear-facing camera, stopping the fourth timer, unlocking the inner screen, and entering the guest mode; or in response to the face image captured by the rear-facing camera not matching the preset face image, continuing to capture a face image by using the rear-facing camera before the fourth timer expires; and in response to an expiration of the fourth timer, and the rear-facing camera still having not captured any face image matching the preset face image, closing the rear-facing camera, and prompting the user that unlocking the inner screen fails.

17. The electronic device according to claim 13, wherein the operations further comprise:

after the unlocking the inner screen, and entering the guest mode in response to the face image captured by the front-facing camera not matching the preset face image, caching the face image captured by the front-facing camera in a first storage space.

18. The electronic device according to claim 17, wherein the operations further comprise:

in response to the inner screen being in a locked and unfolded state, and the outer screen being in the locked and black state, detecting the user's operation of turning on the inner screen;

in response to the user's operation of turning on the inner screen, turning on the inner screen, and starting the front-facing camera and a third timer, wherein timing duration of the third timer is third duration;

before the third timer expires, in response to the front-facing camera capturing a face image, closing the front-facing camera, stopping the third timer, and identifying whether the image captured by the front-facing camera matches the preset face image;

in response to the face image captured by the front-facing camera matching the preset face image, unlocking the inner screen, and entering the master mode; or in response to the face image captured by the front-facing camera not matching the preset face image, determining whether any face image matching the face image captured by the front-facing camera is cached in the first storage space;

in response to a face image matching the face image captured by the front-facing camera being cached in the first storage space, unlocking the inner screen, and entering the guest mode; or in response to no face image matching the face image captured by the front-facing camera being cached in the first storage space, prompting the user to use the rear-facing camera to perform master authorization within fourth duration, and starting the rear-facing camera and a fourth timer, wherein timing duration of the fourth timer is the fourth duration;

before the fourth timer expires, in response to the rear-facing camera capturing a face image, identifying whether the face image captured by the rear-facing camera matches the preset face image; and in response to the face image captured by the rear-facing camera matching the preset face image, closing the rear-facing camera, stopping the fourth timer, unlocking the inner screen, and entering the guest mode; or in response to the face image captured by the rear-facing camera not matching the preset face image, continuing to capture a face image by using the rear-facing camera before the fourth timer expires; and in response to an expiration of the fourth timer, and the rear-facing camera still having not captured any face image matching the preset face image, closing the rear-facing camera, and prompting the user that unlocking the inner screen fails.

\* \* \* \* \*